US012701584B2

(12) United States Patent　　　(10) Patent No.: US 12,701,584 B2

Li et al.　　　(45) Date of Patent: Aug. 4, 2026

(54) CONTROL INFORMATION SENDING METHOD, CONTROL INFORMATION RECEIVING METHOD, APPARATUS, AND STORAGE MEDIUM

(71) Applicant: HUAWEI TECHNOLOGIES CO., LTD., Shenzhen (CN)

(72) Inventors: Qiang Li, Beijing (CN); Yifan Xue, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 18/263,132

(22) PCT Filed: Dec. 10, 2021

(86) PCT No.: PCT/CN2021/137108

§ 371 (c)(1),
(2) Date: Jul. 26, 2023

(87) PCT Pub. No.: WO2022/160968

PCT Pub. Date: Aug. 4, 2022

(65) Prior Publication Data

US 2024/0089985 A1　　　Mar. 14, 2024

(30) Foreign Application Priority Data

Jan. 27, 2021　　(CN) .......................... 202110113974.0
Mar. 31, 2021　　(CN) ......................... 202110351966.X

(51) Int. Cl.
H04W 72/232　　　(2023.01)
H04L 1/1812　　　(2023.01)
(Continued)

(52) U.S. Cl.
CPC ......... *H04W 72/232* (2023.01); *H04L 1/1812* (2013.01); *H04W 72/1273* (2013.01); *H04W 72/21* (2023.01)

(58) Field of Classification Search
CPC ... H04L 1/1812; H04L 1/1822; H04L 1/1854; H04L 1/1896; H04L 5/0055;
(Continued)

(56) References Cited

U.S. PATENT DOCUMENTS 11,902,032 B2 *　2/2024　El Hamss ............. H04L 1/1812
12,244,421 B2 *　3/2025　Khoshnevisan ...... H04L 1/1621
(Continued)

FOREIGN PATENT DOCUMENTS

CN　　107294660 A　　10/2017
CN　　111224755 A　　6/2020
(Continued)

OTHER PUBLICATIONS

Samsung:"HARQ enhancements for NR-U." 3GPP TSG RAN WG1 #96 R1-1902259. Feb. 25-Mar. 1, 2019. total 11 pages.

*Primary Examiner* — Eric Nowlin

(57) ABSTRACT

This application discloses a control information sending method, a control information receiving method, an apparatus, and a storage medium, applied to a communication system. The control information sending method includes: sending at least one piece of downlink control information and a corresponding downlink physical shared channel, where the downlink control information carries a count sequence number; and receiving feedback information from user equipment, where the feedback information includes DCI miss-detection information, the count sequence number indicates an accumulated quantity of uplink control information, the uplink control information corresponds to a downlink physical shared channel scheduled by using the (Continued)

downlink control information, and the uplink control information is used to transmit the feedback information.

16 Claims, 15 Drawing Sheets

(51) Int. Cl.
 *H04W 72/1273* (2023.01)
 *H04W 72/21* (2023.01)

(58) Field of Classification Search
 CPC . H04W 72/1273; H04W 72/21; H04W 72/23;
 H04W 72/232
 See application file for complete search history.

(56) References Cited

U.S. PATENT DOCUMENTS

| | | | | |
|---|---|---|---|---|
| 12,262,377 | B2 * | 3/2025 | Liang | H04L 1/1628 |
| 12,328,723 | B2 * | 6/2025 | Lei | H04L 1/1812 |

| | | | | |
|---|---|---|---|---|
| 2019/0149271 | A1 * | 5/2019 | Yin | H04L 1/1607 |
| | | | | 370/329 |
| 2019/0159206 | A1 * | 5/2019 | Sun | H04L 5/0094 |
| 2020/0396760 | A1 * | 12/2020 | Yi | H04W 72/23 |
| 2021/0051702 | A1 * | 2/2021 | Bhattad | H04L 1/1664 |
| 2021/0111835 | A1 * | 4/2021 | Khoshnevisan | H04W 72/02 |
| 2021/0184801 | A1 * | 6/2021 | El Hamss | H04L 1/1896 |
| 2021/0328728 | A1 * | 10/2021 | El Hamss | H04L 1/1864 |
| 2022/0217698 | A1 * | 7/2022 | Lee | H04W 4/40 |
| 2022/0232602 | A1 * | 7/2022 | Liang | H04L 5/0053 |
| 2022/0294591 | A1 * | 9/2022 | Liu | H04L 5/0053 |
| 2023/0164794 | A1 * | 5/2023 | Matsumura | H04L 1/1861 |
| | | | | 370/329 |
| 2023/0217440 | A1 * | 7/2023 | Uziel | H04W 72/20 |
| | | | | 370/329 |

FOREIGN PATENT DOCUMENTS

| | | | | |
|---|---|---|---|---|
| CN | 111525978 A | 8/2020 | | |
| CN | 111740807 A | 10/2020 | | |
| CN | 113994617 B * | 9/2024 | | H04W 72/20 |
| WO | WO-2020252640 A1 * | 12/2020 | | H04W 72/20 |

* cited by examiner

1

(a)                              (b)                              (c)

Send at least one piece of DCI and a PDSCH corresponding to the at least one piece of DCI to user equipment, where the DCI carries a count sequence number    101

Detect a feedback message from the user equipment    102

DCI

PDSCH (1st TX)

DCI

PDSCH (2nd TX)

DCI

PDSCH (3rd TX)

Feedback information

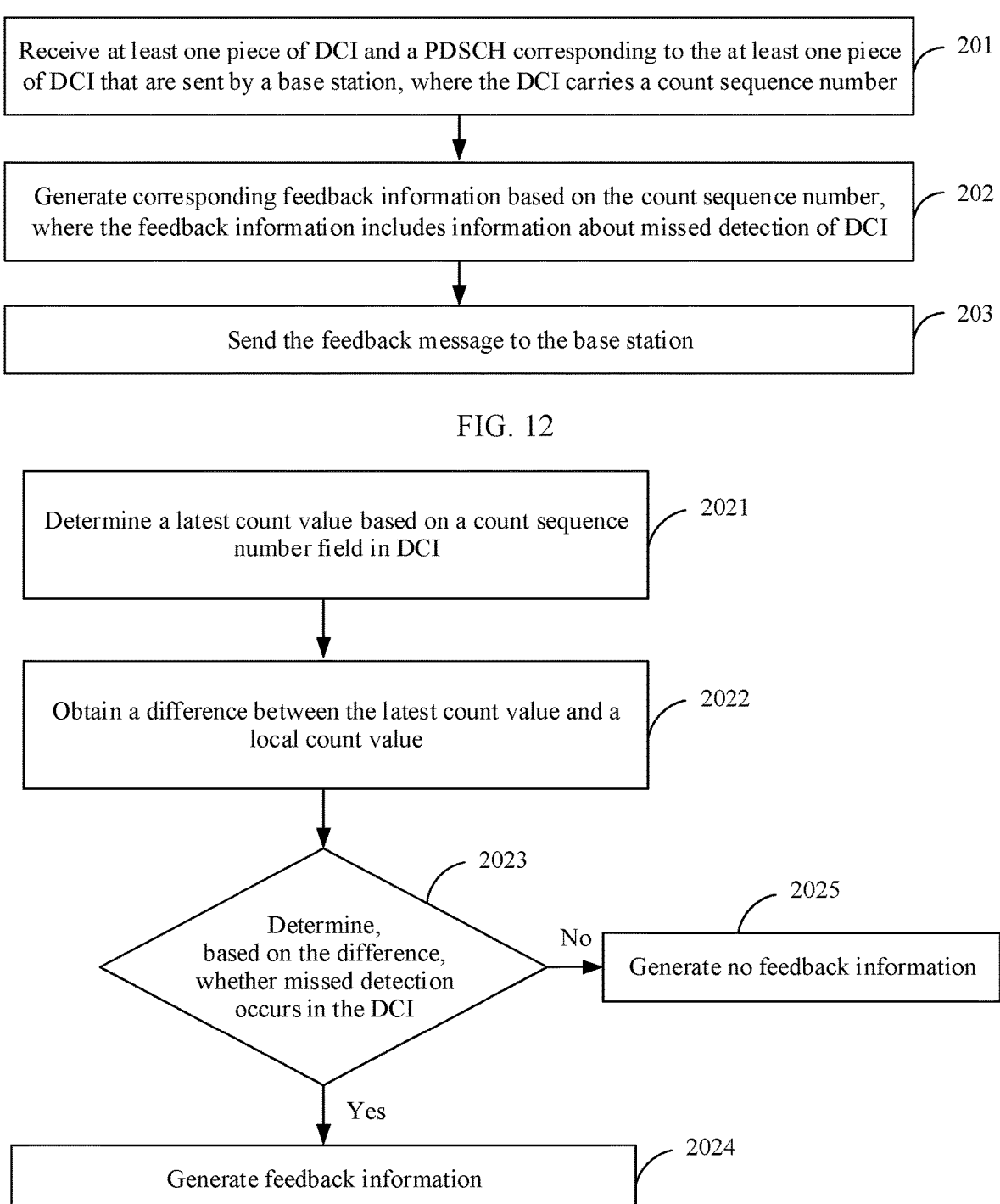

Receive at least one piece of DCI and a PDSCH corresponding to the at least one piece of DCI that are sent by a base station, where the DCI carries a count sequence number — 201

Generate corresponding feedback information based on the count sequence number, where the feedback information includes information about missed detection of DCI — 202

Send the feedback message to the base station — 203

FIG. 12

Determine a latest count value based on a count sequence number field in DCI — 2021

Obtain a difference between the latest count value and a local count value — 2022

Determine, based on the difference, whether missed detection occurs in the DCI — 2023

No → Generate no feedback information — 2025

Yes → Generate feedback information — 2024

FIG. 13

CONTROL INFORMATION SENDING METHOD, CONTROL INFORMATION RECEIVING METHOD, APPARATUS, AND STORAGE MEDIUM

CROSS-REFERENCE TO RELATED APPLICATIONS

This application is a National Stage of International Application No. PCT/CN2021/137108, filed on Dec. 10, 2021, which claims priorities to Chinese Patent Application No. 202110113974.0, filed on Jan. 27, 2021, and Chinese Patent Application No. 202110351966.X, filed on Mar. 31, 2021. All of the aforementioned patent applications are hereby incorporated by reference in their entireties.

TECHNICAL FIELD

This application relates to the field of communication technologies, and in particular, to a control information sending method, a control information receiving method, an apparatus, and a storage medium.

BACKGROUND

In 5G NR (new radio), when a base station sends a downlink data packet to user equipment (User Equipment, "UE" for short), the base station first sends a piece of downlink control information (DCI, Downlink control information) to target UE on a downlink physical control channel (PDCCH, Physical downlink control channel). The DCI is a piece of control signaling, and indicates related information of the scheduled data packet. The DCI does not include data information, and the actual data packet is sent on a physical downlink data channel (PDSCH, Physical downlink shared channel).

After successfully receiving the DCI, the UE obtains related information of the scheduled PDSCH. The UE receives a received signal based on control information obtained from the DCI. After demodulation and decoding are complete, the UE can determine whether the data packet is correctly received by using a parity bit. If the UE correctly receives the data packet, the UE feeds back acknowledgment (ACK) information to the base station in an uplink by using uplink control information (UCI, uplink control information), to indicate that the data is correctly received. The UCI may be transmitted on an uplink physical control channel (PUCCH, Physical uplink control channel) or an uplink physical shared channel (PUSCH, Physical uplink shared channel). If the user equipment cannot correctly receive the data packet, the user equipment feeds back non-acknowledgment (NACK) information to the base station in an uplink, to indicate that the data packet fails to be received. After receiving the NACK information, the base station usually needs to retransmit the data packet to the UE. Such a feedback retransmission mechanism is referred to as a hybrid automatic repeat request (HARD).

If the UE fails to receive the DCI, that is, misses detecting the DCI, the UE cannot receive the data packet on the PDSCH, and does not feed back ACK/NACK. Because the base station receives no ACK and NACK, the base station retransmits the data until the base station receives the ACK feedback from the UE or a maximum quantity of retransmission times is reached.

In some application scenarios, the base station may configure the UE to perform ACK/NACK feedback on a plurality of data packets by using one piece of uplink control information (UCI, uplink control information), and add a downlink scheduling indication (DAI, Downlink assignment index) to the DCI. The DAI is used to count the plurality of downlink data packets corresponding to the UCI, and whether a data packet is lost may be determined based on continuity of a DAI count.

Some conventional technologies disclose that, UE performs HARQ-ACK feedback on one or more PDSCHs by using same UCI; if feedback information is all ACK, the UE does not feed back to the base station; and if at least one PDSCH is not successfully received, the UE feeds back HARQ-ACK information.

In this mechanism, if the plurality of PDSCHs need to be fed back by using one the same UCI, and a part of the DCI corresponding to the UCI is missed detecting, the missed detection may be found through continuity of a DAI count. However, if the plurality of PDSCHs need to be fed back by using the same UCI, and all DCI corresponding to the UCI is missed detecting, the missed detection of the DCI cannot be found by using the DAI, and the UE does not send the HARQ-ACK information in the UCI, but the base station determines that the data has been correctly received by the UE and does not retransmit the data. As a result, a data packet is lost.

In some other application scenarios, one piece of same UCI corresponds to one piece of DCI and a PDSCH scheduled by the DCI. In this case, the DCI does not need to carry a DAI. If the DCI is missed detecting, and the UE cannot detect the DCI and cannot perform feedback to the base station, the base station determines that data has been correctly received by the UE and does not retransmit the data again. As a result, a data packet is lost.

SUMMARY

Embodiments of the present invention provide a control information sending method, a control information receiving method, an apparatus, a storage medium, and a device, to resolve a problem that, in a NACK only mechanism, a data packet is lost because all DCI corresponding to a plurality of PDSCHs that need to be fed back by user equipment by using one piece of same UCI is missed detecting.

According to a first aspect, an embodiment of this application provides a control information sending method, including: sending at least one piece of downlink control information and a downlink physical shared channel corresponding to the at least one piece of downlink control information, where the downlink control information carries a count sequence number; and detecting feedback information from user equipment, where the feedback information includes DCI miss-detection information, the count sequence number indicates an accumulated quantity of uplink control information, the uplink control information corresponds to a downlink physical shared channel scheduled by using the downlink control information, and the uplink control information is used to transmit the feedback information.

The user equipment in this embodiment of this application can perform feedback information based on continuity of count sequence numbers of a plurality of pieces of DCI corresponding to a plurality of pieces of UCI sent by the base station, and the base station can determine, based on the feedback information, whether DCI missed detection occurs, to resolve a problem that the base station does not retransmit a data packet and the data packet is lost when missed detection of all DCI corresponding to a plurality of PDSCHs that need to be fed back by the user equipment by using one piece of same UCI occurs, and there is no feedback information.

In some implementations of the first aspect, the DCI miss-detection information includes an accumulated quantity of uplink control information corresponding to downlink control information that is missed detecting.

In this way, the base station may quickly determine, by using the DCI miss-detection information, the quantity of uplink control information corresponding to the downlink control information that is missed detecting.

In some implementations of the first aspect, the feedback information further includes a hybrid automatic repeat request response message.

In some implementations of the first aspect, the detecting feedback information from user equipment specifically includes:

if the feedback information is not received, determining that all the downlink control information corresponding to the uplink control information is correctly received; or if the feedback information is received, determining, based on the feedback information, that the downlink control information corresponding to the uplink control information is missed detecting.

In an implementation of the first aspect, the method further includes:

configuring an enabling rule based on capability information of the user equipment, so that the user equipment determines, according to the enabling rule, that the count sequence number is available.

In some implementations of the first aspect, the downlink control information further carries an indication for temporarily disabling NACK only, to control the user equipment to temporarily disable a NACK only feedback mechanism.

In some implementations of the first aspect, the downlink control information further carries a downlink assignment index.

In some implementations of the first aspect, the count sequence number is an independent field or a HARQ process number field.

In some implementations of the first aspect, a quantity of bits occupied by the count sequence number is any one of bits 1-6.

According to a second aspect, an embodiment of this application provides a control information receiving method, including: receiving at least one piece of downlink control information and a downlink physical shared channel corresponding to the at least one piece of downlink control information that are sent by a base station, where the downlink control information carries a count sequence number; generating corresponding feedback information based on the count sequence number, where the feedback information includes DCI miss-detection information; and sending the feedback message to the base station, where the count sequence number indicates an accumulated quantity of uplink control information, the uplink control information corresponds to a downlink physical shared channel scheduled by using the downlink control information, and the uplink control information is used to transmit the feedback information.

In some implementations of the second aspect, the count sequence number is an independent field or a HARQ process number field.

In some implementations of the second aspect, a quantity of bits occupied by the count sequence number is any one of bits 1-6.

In some implementations of the second aspect, the DCI miss-detection information includes an accumulated quantity of uplink control information corresponding to downlink control information that is missed detecting.

In some implementations of the second aspect, the downlink control information further carries an indication for temporarily disabling NACK only, to control user equipment to temporarily disable a NACK only feedback mechanism.

In some implementations of the second aspect, the generating corresponding feedback information based on the count sequence number specifically includes: determining a latest count value based on a count sequence number field in the downlink control information; obtaining a difference between the latest count value and a local count value, where the local count value is a value that is recorded by the user equipment and that corresponds to a last received count sequence number field; determining, based on the difference, whether the downlink control information is missed detecting; and if the downlink control information is missed detecting, generating the feedback information.

In some implementations of the second aspect, the obtaining a difference between the latest count value and a local count value, and determining, based on the difference, whether the downlink control information is missed detecting specifically includes: determining whether the latest count value is greater than the local count value; if the latest count value is greater than the local count value, obtaining the difference according to the following formula: $DS=s_n-S$, where $\Delta S$ is the difference, $S_n$ is the latest count value, and S is the local count value; or if the latest count value is not greater than the local count value, obtaining the difference according to the following formula: $\Delta S=S_n+N-S$, where $N=2^n$, n is a field length of the count sequence number; and determining whether the difference is 1; and if the difference is 1, determining that the user equipment does not miss detecting all downlink control information corresponding to uplink control information; or if the difference is not 1, determining that the user equipment misses detecting all downlink control information corresponding to $\Delta S-1$ pieces of uplink control information.

In some implementations of the second aspect, the feedback information further includes a hybrid automatic repeat request response message.

In some implementations of the second aspect, the downlink control information further carries a downlink assignment index, the feedback information further includes the hybrid automatic repeat request response message, and the generating corresponding feedback information based on the count sequence number specifically includes:

determining, based on the downlink assignment index, whether downlink control information corresponding to the same uplink control information is missed detecting; if downlink control information corresponding to the same uplink control information is missed detecting, generating a corresponding hybrid automatic repeat request response message; or if the downlink control information corresponding to the same uplink control information is not missed detecting, determining, based on the count sequence number, whether all downlink control information corresponding to the uplink control information is missed detecting; and if all downlink control information corresponding to the uplink control information is missed detecting, generating corresponding DCI miss-detection information.

In some implementations of the second aspect, the determining, based on the downlink assignment index, whether downlink control information corresponding to the same downlink control information is missed detecting specifically includes: determining a latest count value based on a count sequence number field in downlink control information, and obtaining a difference between the latest count value and a local count value, where the local count value is a value that is recorded by the user equipment and that corresponds to a last received count sequence number field; and determining, based on the difference, whether all downlink control information corresponding to the uplink control information is missed detecting.

In some implementations of the second aspect, the determining, based on the difference, whether all downlink control information corresponding to the uplink control information is missed detecting specifically includes: determining whether the latest count value is greater than the local count value; and if the latest count value is greater than the local count value, obtaining the difference according to the following formula: $DS=S_n-\check{S}$, where $\Delta S$ is the difference, $S_n$ is the latest count value, and S is the local count value; and if the latest count value is not greater than the local count value, obtaining the difference according to the following formula: $\Delta S=S_n+N-5$, where $N=2^n$, n is a field length of the count sequence number; determining whether the difference is 1; if the difference is 1, determining that the user equipment misses detecting all downlink control information corresponding to the uplink control information; or if the difference is not 1, determining that the user equipment misses detecting in all downlink control information corresponding to $\Delta S-1$ pieces of uplink control information.

According to a third aspect, an embodiment of this application provides an apparatus. The apparatus may be a network device, and includes:

a memory, configured to store a computer program; and a processor, configured to execute the computer program stored in the memory, where when the computer program is executed, the processor is configured to perform the method in any implementation of the first aspect.

According to a fourth aspect, an embodiment of this application provides an apparatus. The apparatus may be user equipment, and includes:

a memory, configured to store a computer program; and a processor, configured to execute the computer program stored in the memory, where when the computer program is executed, the processor is configured to perform the method in any implementation of the second aspect.

According to a fifth aspect, an embodiment of this application provides a computer-readable storage medium. The computer-readable storage medium includes computer instructions, and when the computer instructions are run on an electronic device, the electronic device is enabled to perform the method in any one of the possible implementations of the first aspect.

According to a sixth aspect, an embodiment of this application provides a computer-readable storage medium. The computer-readable storage medium includes computer instructions, and when the computer instructions run on an electronic device, the electronic device is enabled to perform the method in any one of the possible implementations of the second aspect.

6

Figure 2:
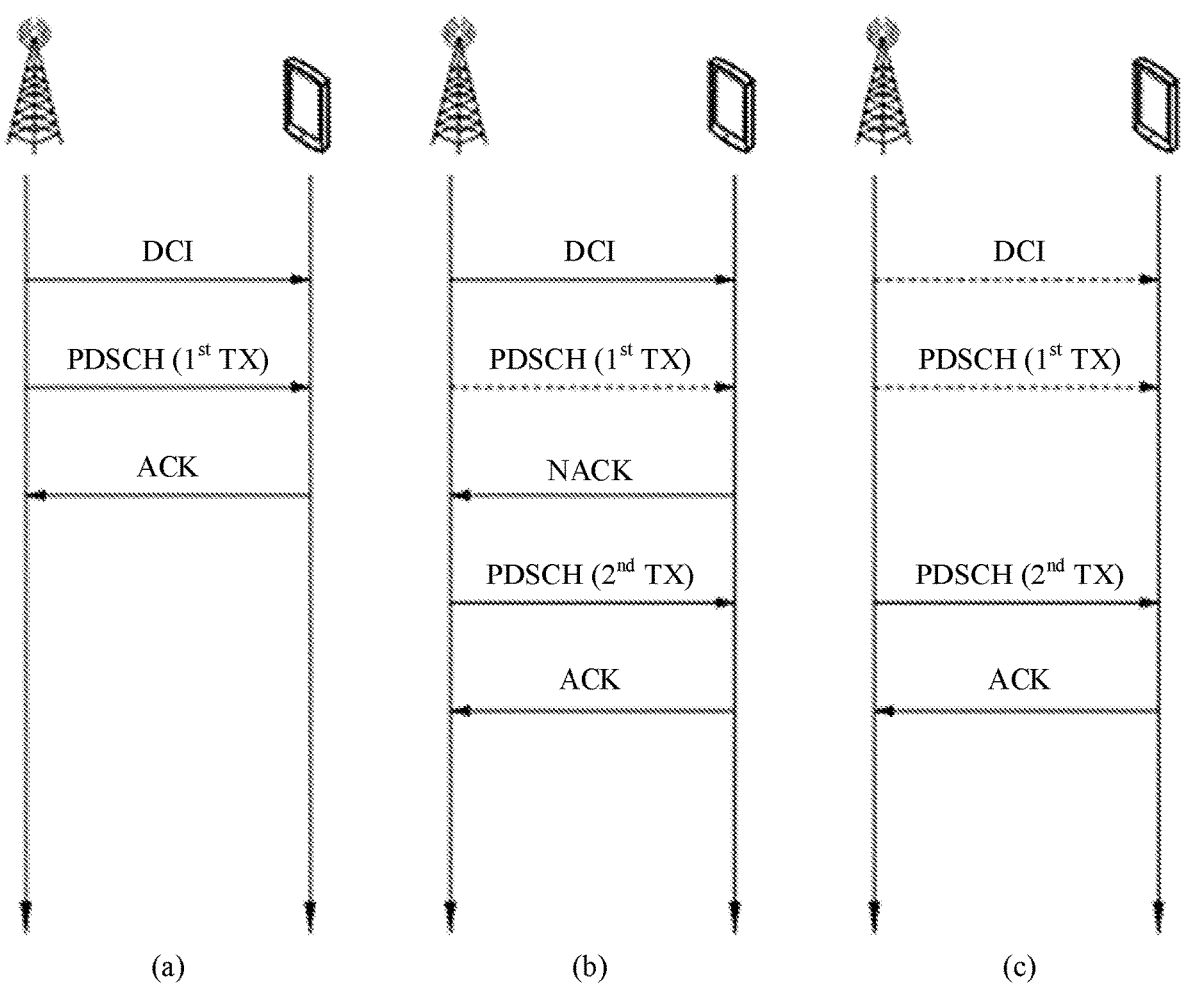
Figures 3, 4A:
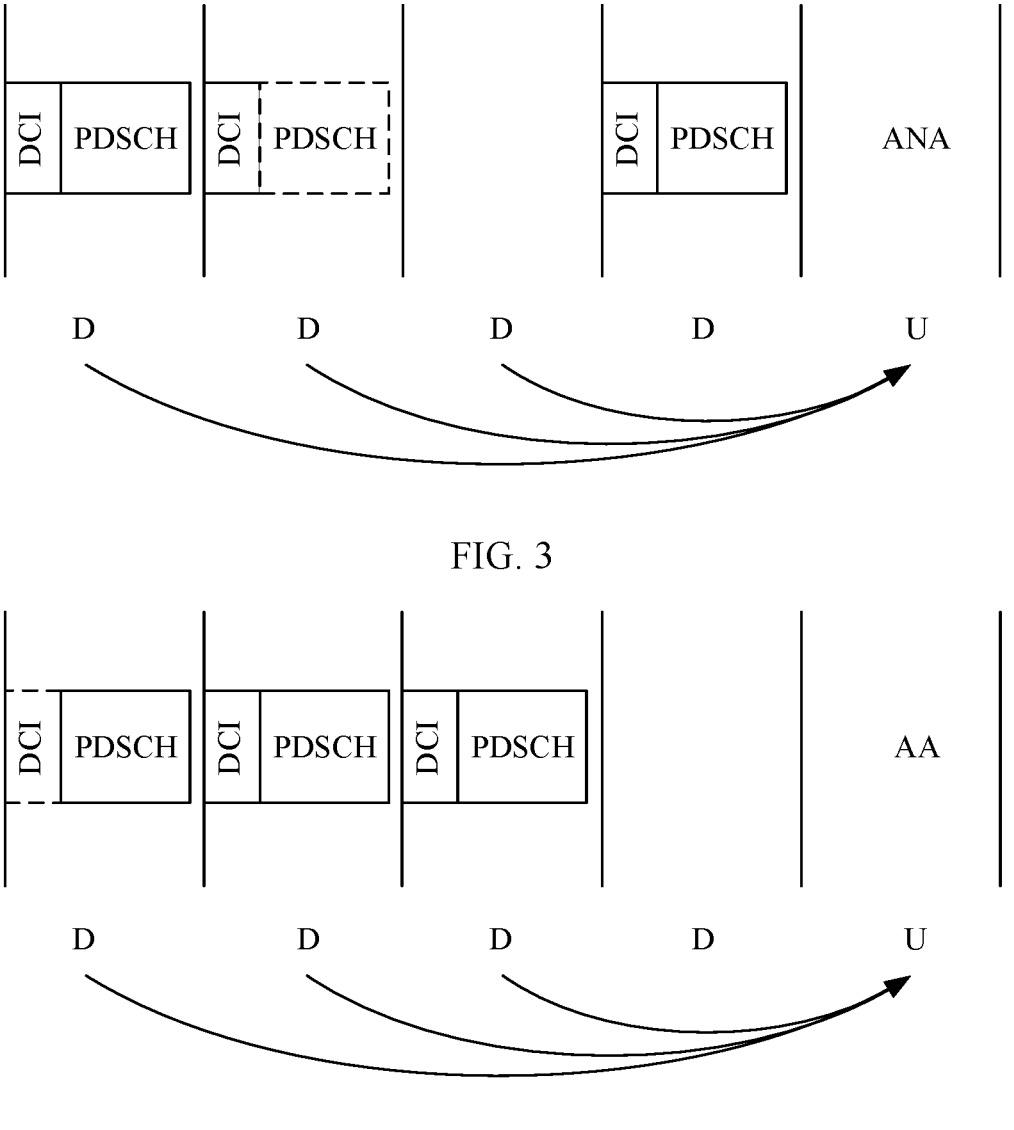
Figure 4B:
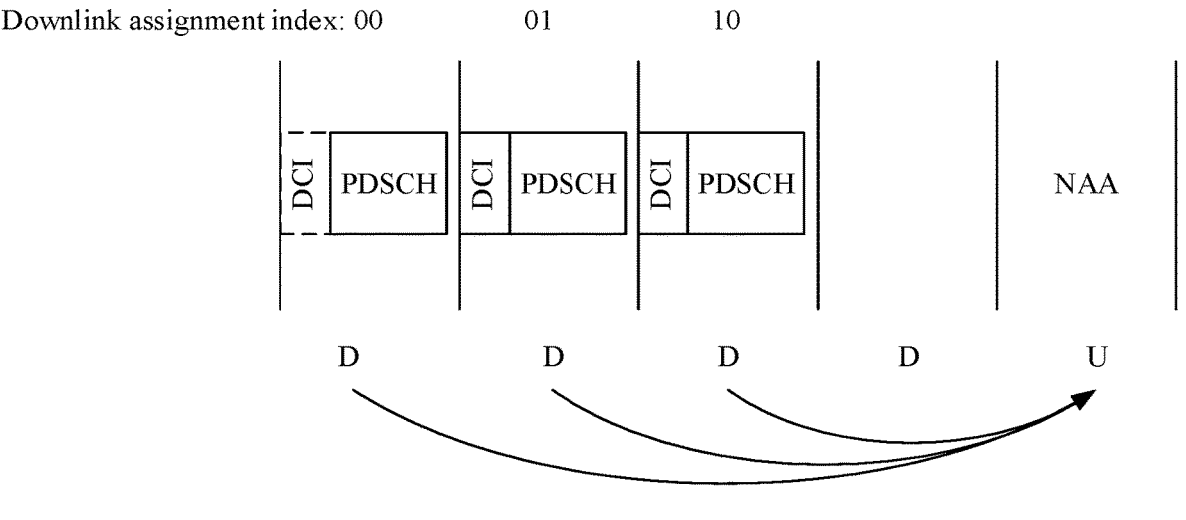
Figure 5:
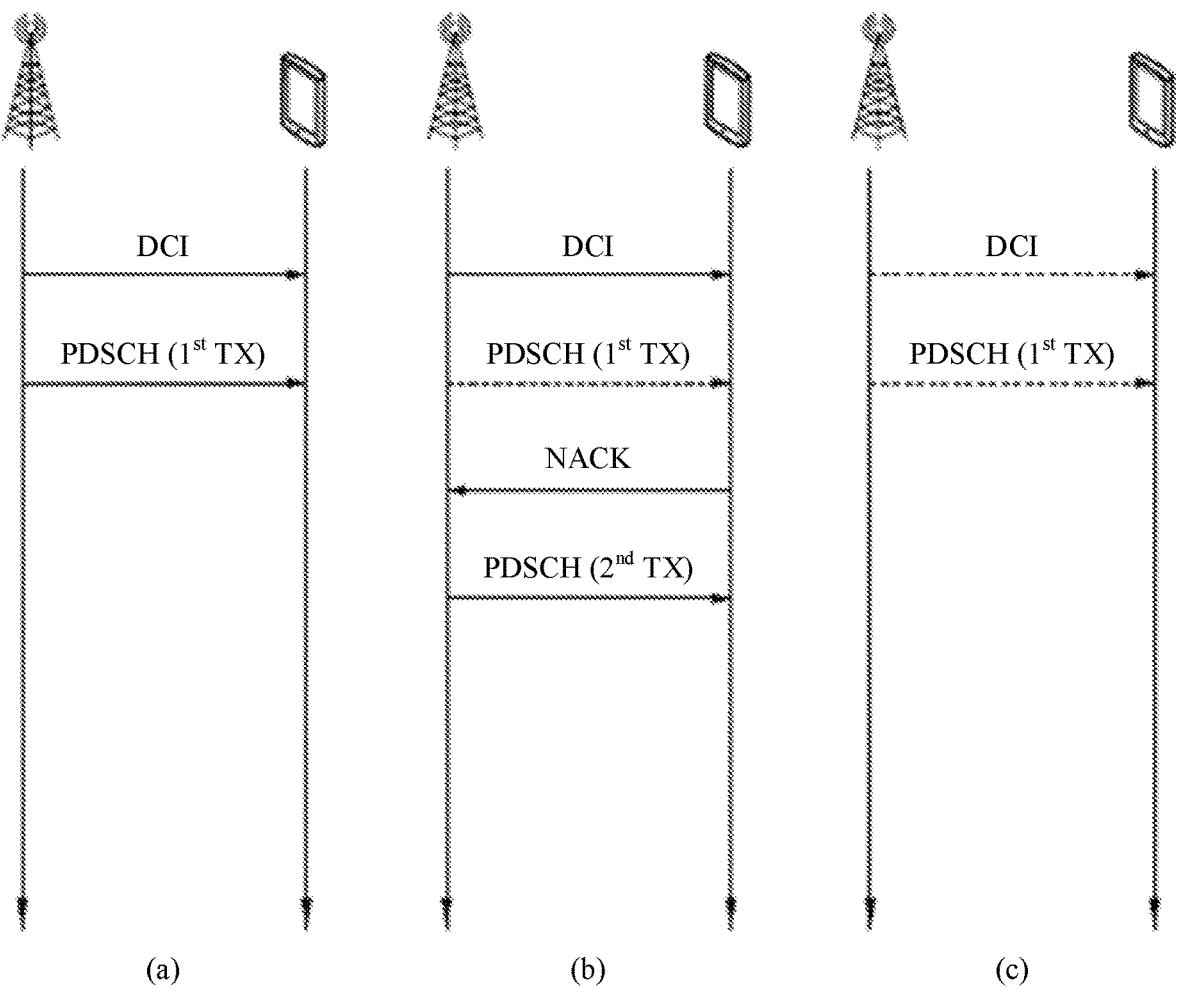
Figure 6:
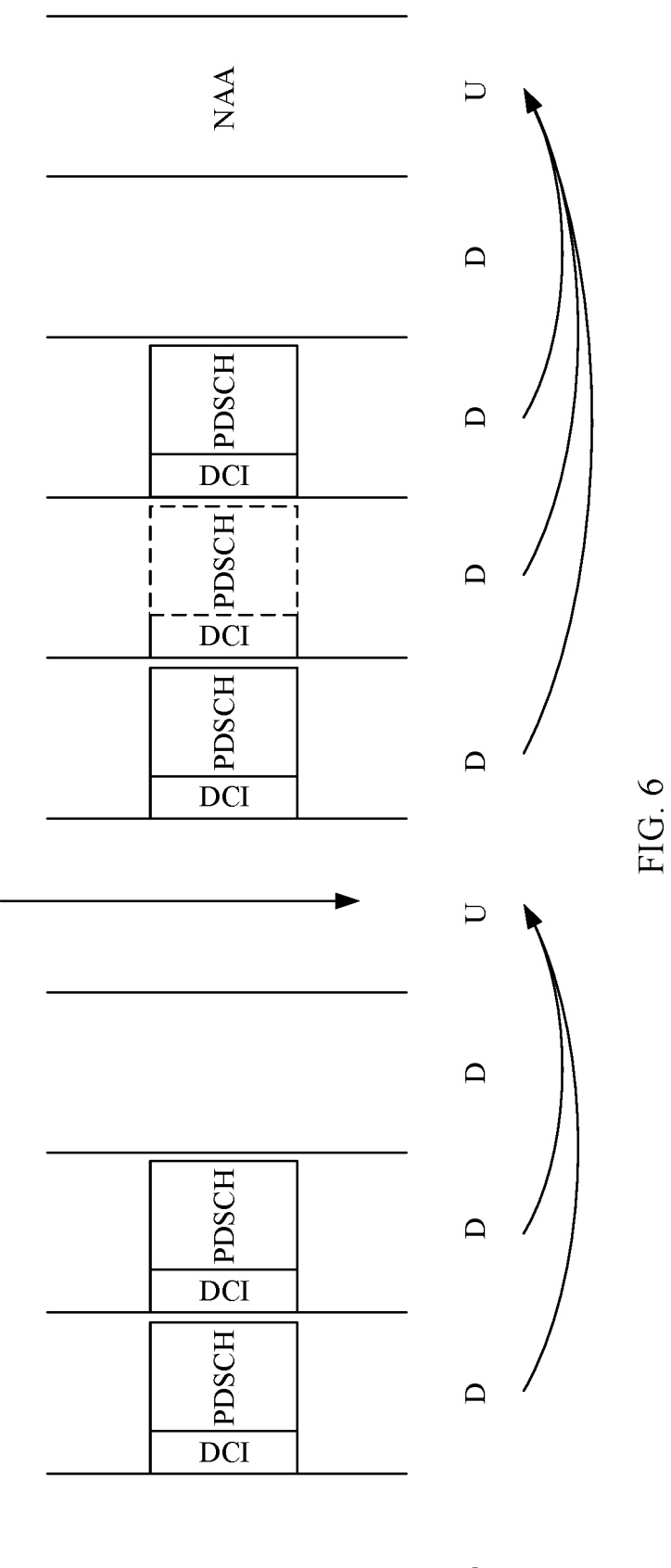
Figure 7:
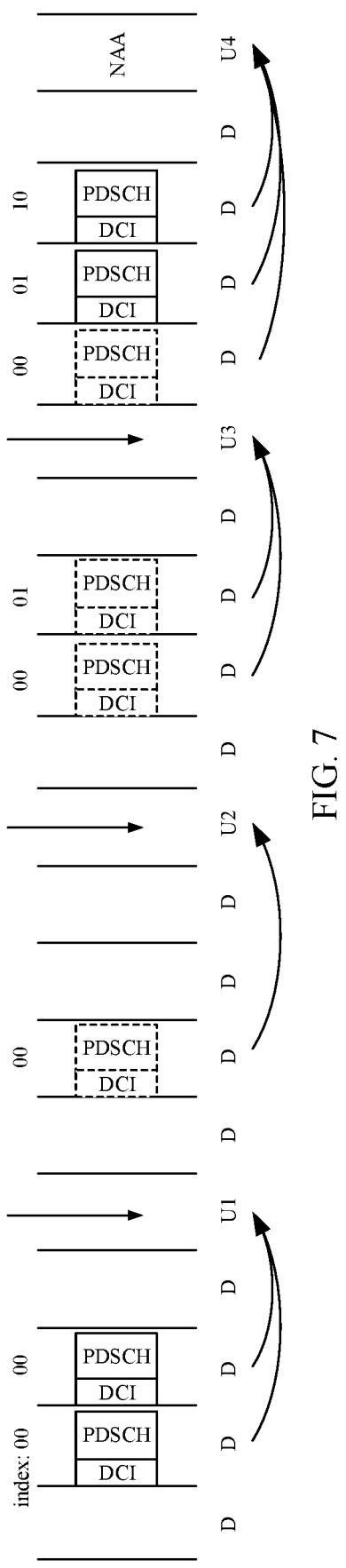
Figure 8:
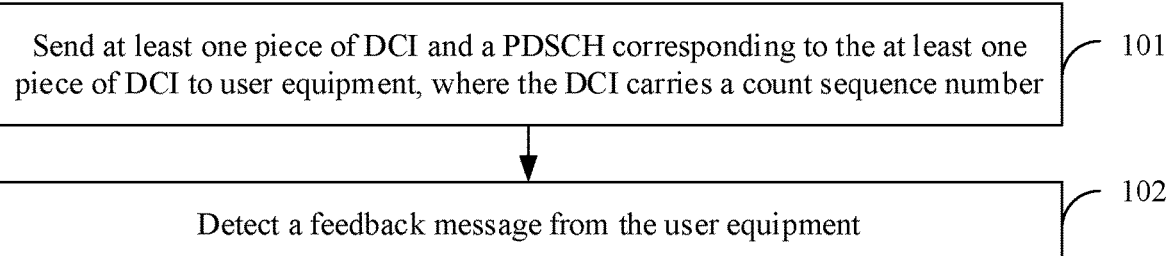
Figure 9:
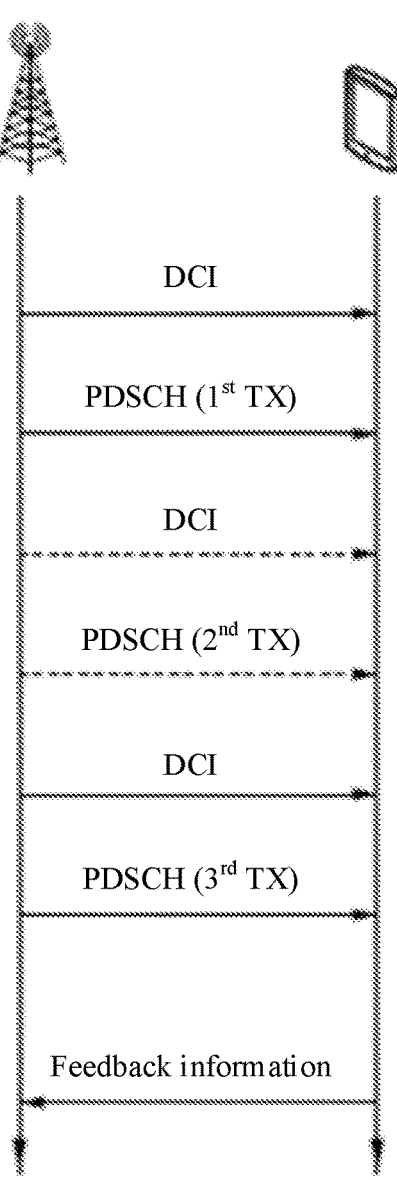
Figure 10:
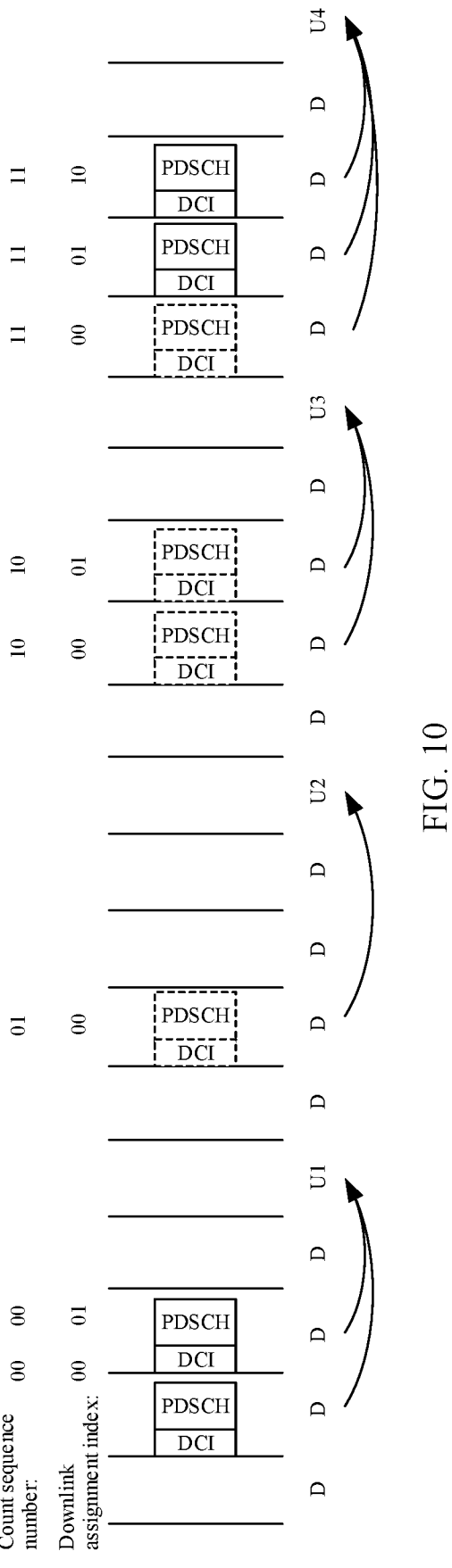
Figure 11:
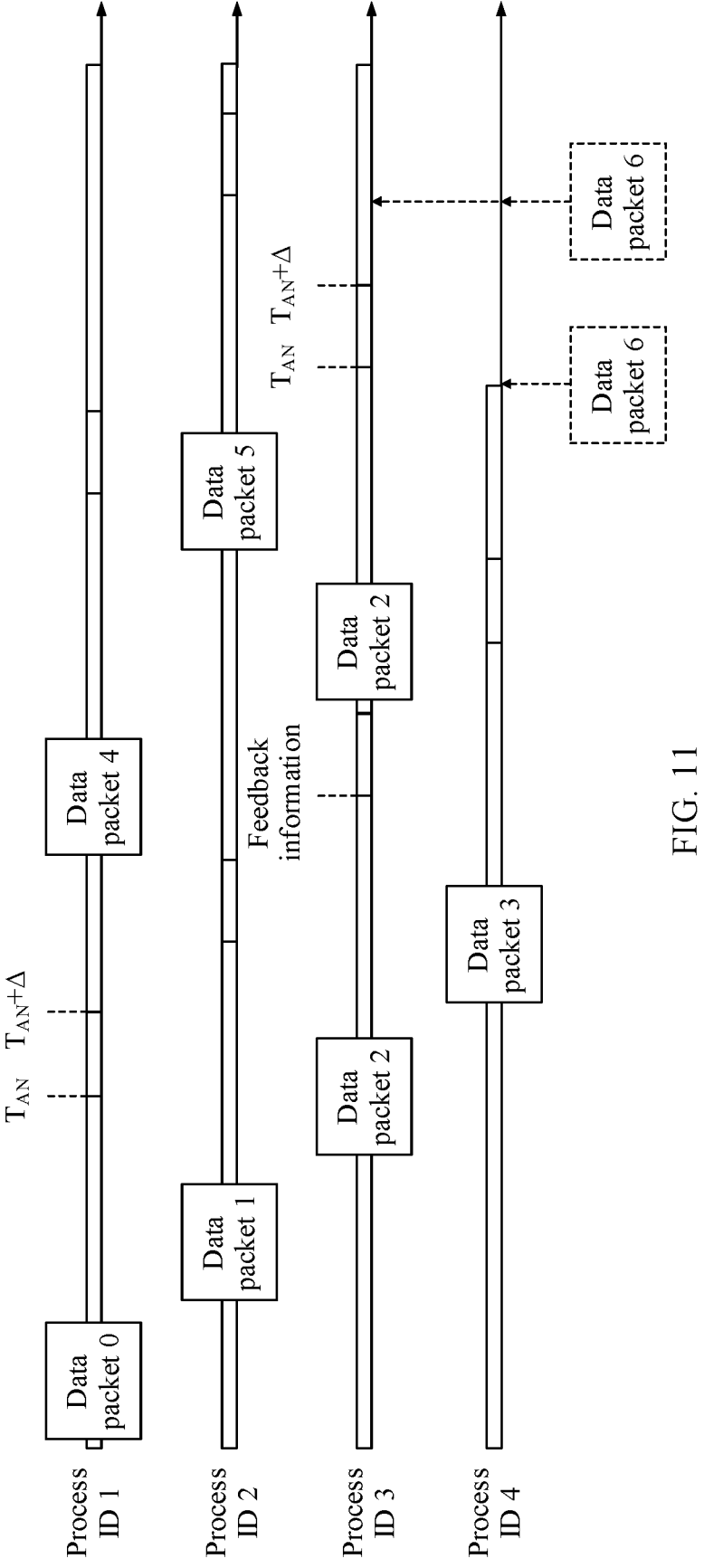
Figure 14:
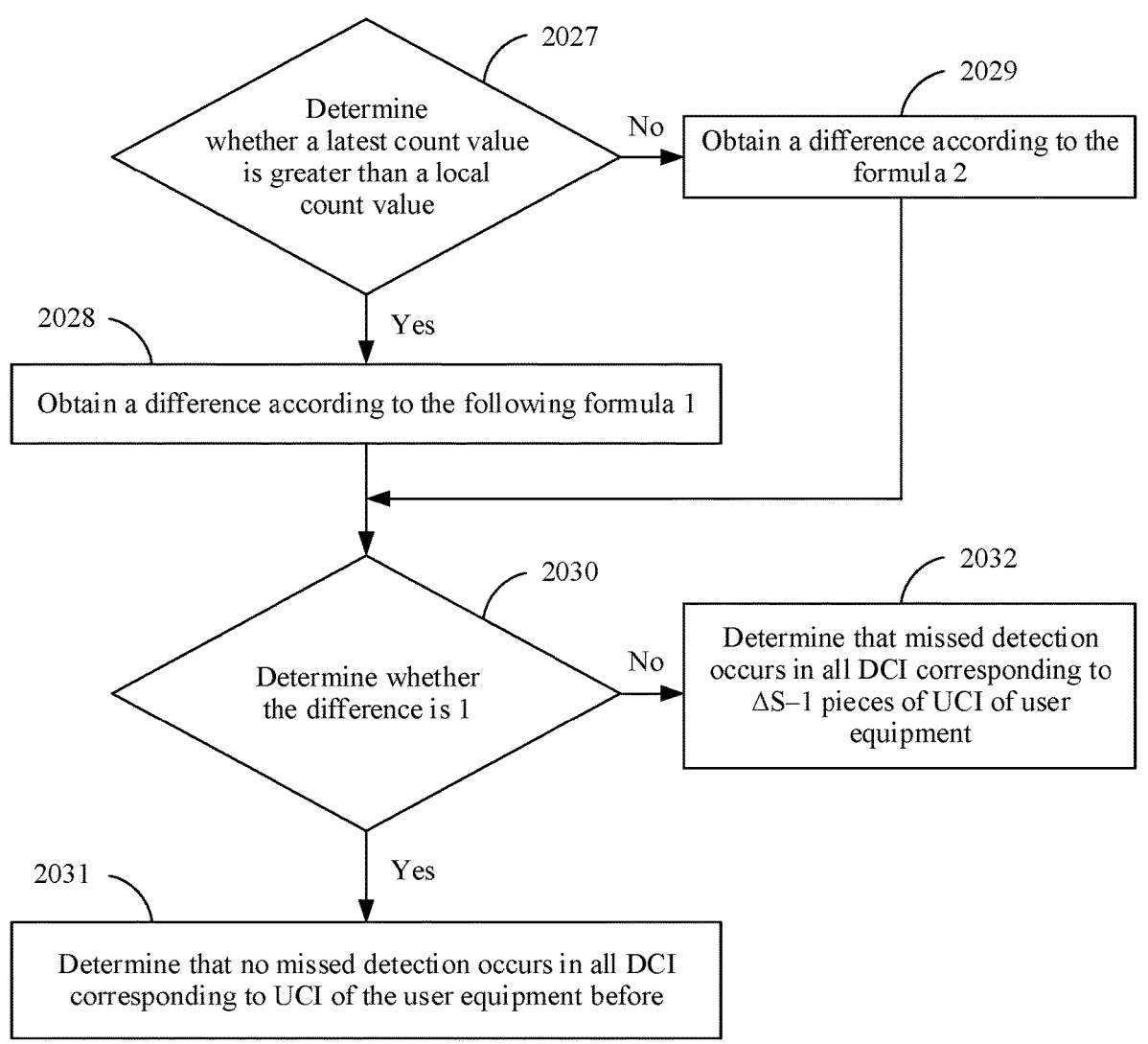
Figure 15:
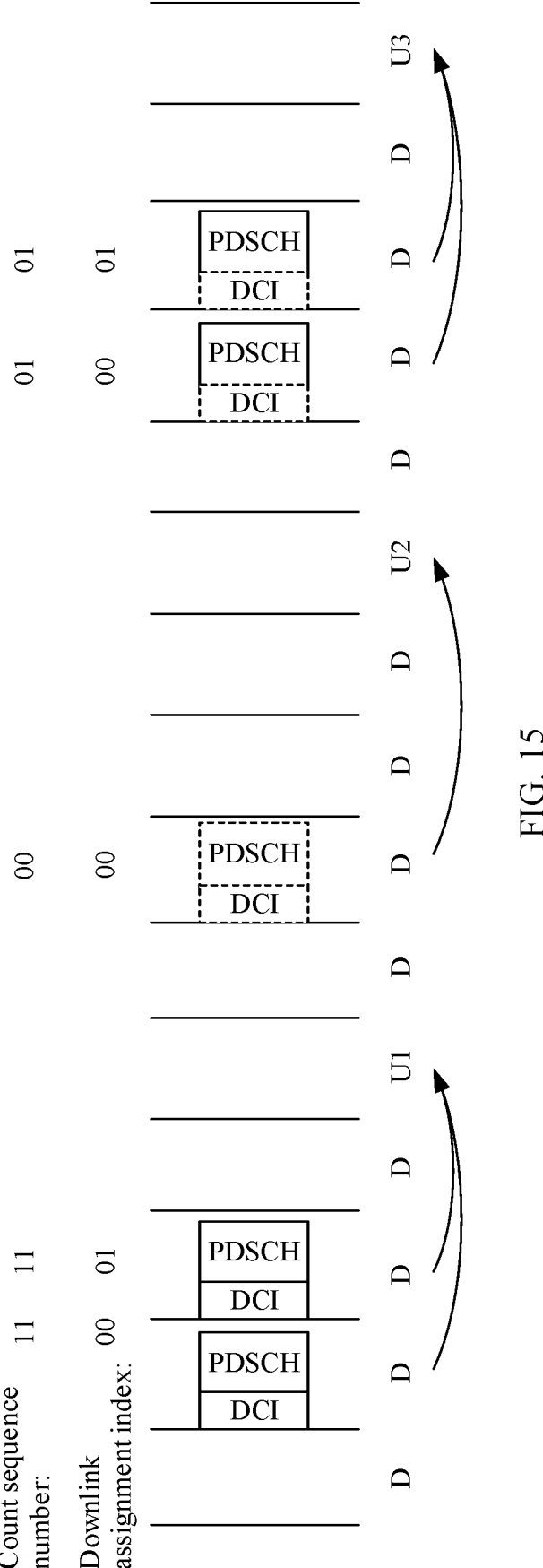
Figures 16, 17:
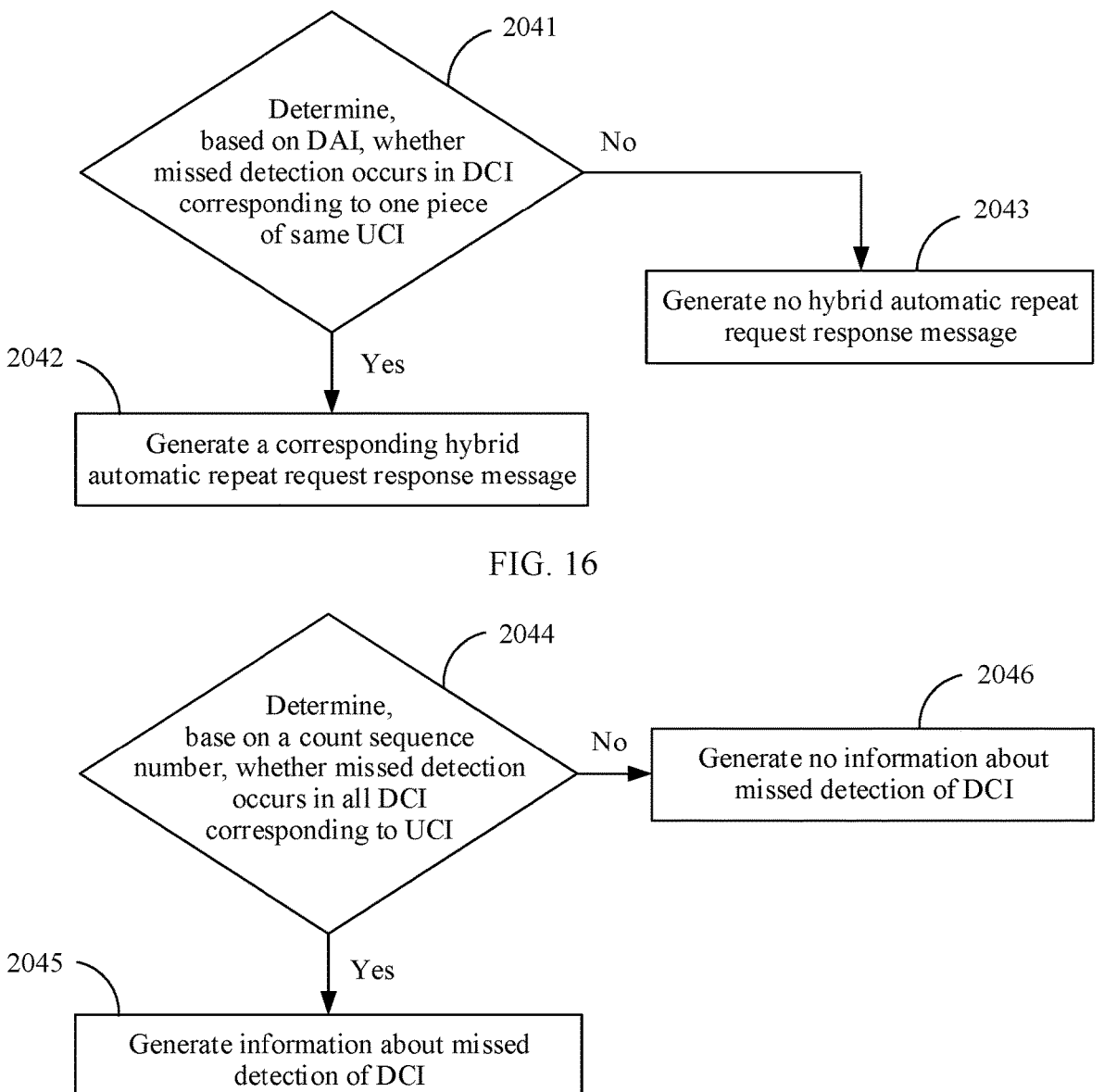
Figure 18:
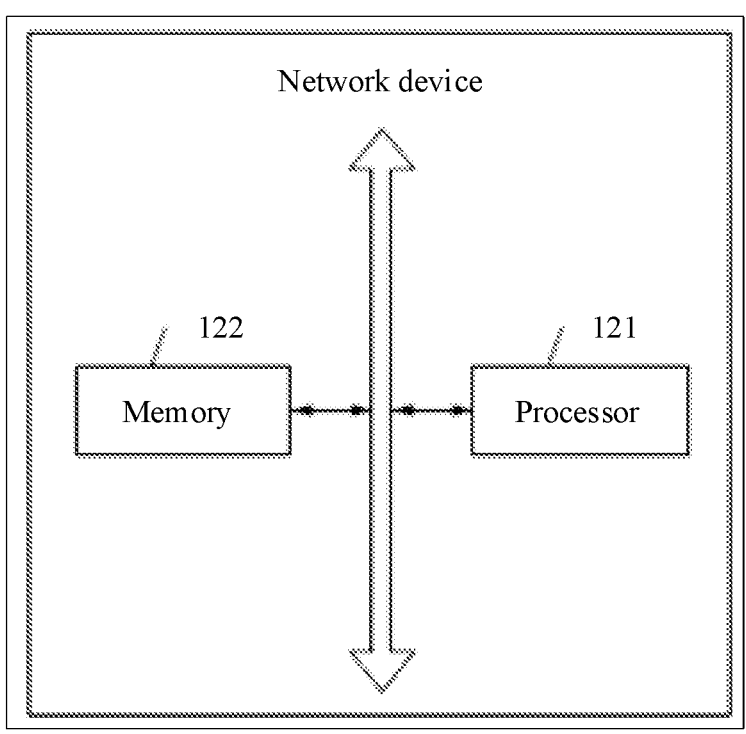
Figure 19:
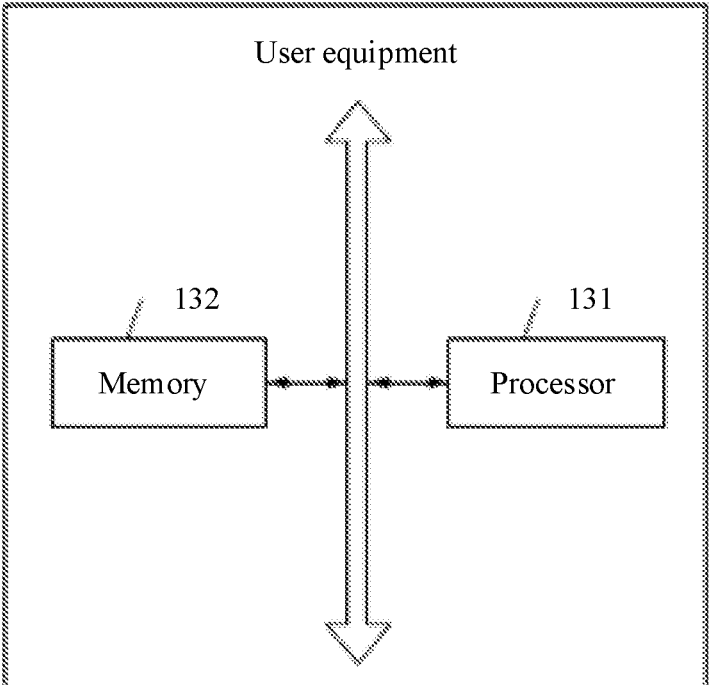

FIG. 2 is a schematic diagram of a physical-layer feedback and retransmission mechanism in cellular communication according to an embodiment of this application;

FIG. 3 is a schematic diagram of an aggregated feedback mechanism in a TDD communication system according to an embodiment of this application;

FIG. 4a is a schematic diagram of DCI missed detection in an aggregated feedback mechanism according to an embodiment of this application;

FIG. 4b is a schematic diagram of DCI missed detection in an aggregated feedback mechanism according to another embodiment of this application;

FIG. 5 is a schematic flowchart of applying an aggregated feedback to a NACK only mechanism according to an embodiment of this application;

FIG. 6 is a schematic diagram of applying an aggregated feedback to a NACK only mechanism according to an embodiment of this application;

FIG. 7 is a schematic diagram of applying an aggregated feedback to another NACK only mechanism according to an embodiment of this application;

FIG. 8 is a flowchart of Embodiment 1 of a control information sending method according to the present invention;

FIG. 9 is a schematic flowchart of transmitting control information in a communication system according to an embodiment of the present invention;

FIG. 10 is a schematic diagram of transmitting control information in a communication system according to another embodiment of the present invention;

FIG. 11 is a schematic diagram of data packet transmission according to an embodiment of the present invention;

FIG. 12 is a flowchart of Embodiment 1 of a control information receiving method according to the present invention;

FIG. 13 is a flowchart of Embodiment 1 of a feedback information generation method according to the present invention;

FIG. 14 is a flowchart of Embodiment 1 of a DCI missed detection determination method according to the present invention;

FIG. 15 is a schematic diagram of transmitting control information in a communication system according to another embodiment of the present invention;

FIG. 16 is a schematic diagram of generating an automatic repeat request response message according to an embodiment of the present invention;

FIG. 17 is a schematic diagram of generating DCI miss-detection information according to an embodiment of the present invention;

FIG. 18 is a schematic diagram of a structure of a network device according to an embodiment of this application; and FIG. 19 is a schematic diagram of a structure of user equipment according to an embodiment of this application.

DESCRIPTION OF EMBODIMENTS

To make the objectives, technical solutions, and advantages of this application clearer, the following further describes implementations of this application in detail with reference to the accompanying drawings.

Before embodiments of this application are described in detail, an application scenario in embodiments of this application is first described.

The technical solutions in embodiments of this application are applied to new radio (new radio, NR) in a 5th generation (5th generation, 5G) mobile communication system, a future mobile communication system, or the like.

User equipment in embodiments of this application may be a terminal device, an access terminal, a subscriber unit, a subscriber station, a mobile station, a mobile console, a remote station, a remote terminal, a mobile device, a user terminal, a terminal, a wireless communication device, a user agent, or a user apparatus. The user equipment may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, user equipment in a 5G network, user equipment in a future evolved public land mobile network (public land mobile network, PLMN), or the like. This is not limited in embodiments of this application.

A network device in embodiments of this application may be a device configured to communicate with user equipment. The network device may be a NodeB (NodeB, NB), an evolved NodeB (evolved NodeB, eNB), a base station in NR in a 5G mobile communication system, a base station in a future mobile communication system, an access node in a Wi-Fi system, or the like. A specific technology and a specific device form used by the network device are not limited in embodiments of this application. Unless otherwise stated, in this application, expressions of a 5G system and an NR system are interchangeable.

In embodiments of this application, the user equipment or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the user equipment or the network device, or a functional module that is in the user equipment or the network device and that can invoke and execute the program.

Figure 1:
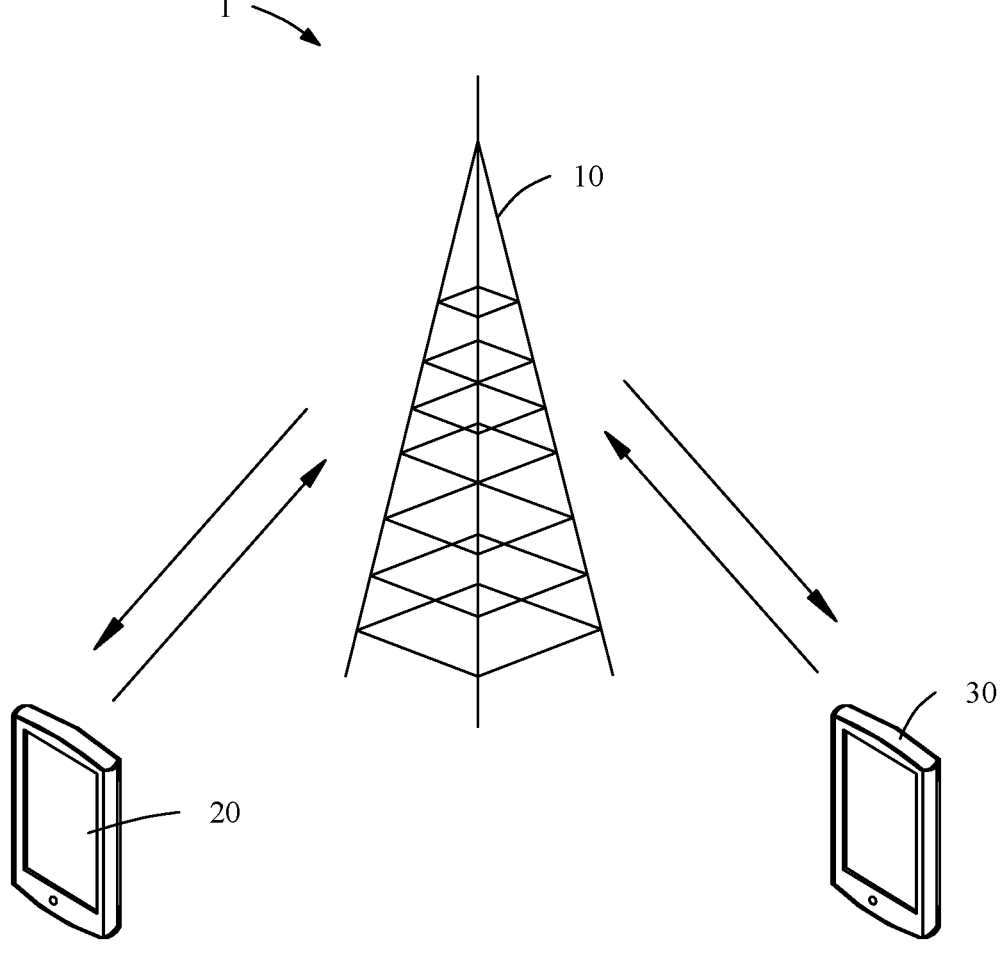
FIG. 1 is a schematic diagram of a communication system to which an embodiment of this application is applicable.

For ease of understanding embodiments of this application, a communication system to which embodiments of this application is applicable is first briefly described with reference to FIG. 1. The communication system is, for example, NR, V2X, LTE-V, V2V, Internet of Vehicles, MTC, IoT, LTE-M, M2M, or Internet of Things. FIG. 1 is a schematic diagram of a system 1 to which an embodiment of this application is applicable. As shown in FIG. 1, the communication system 1 includes a network device 10, and the communication system 1 further includes user equipment 20 and user equipment 30 that are located within a coverage range of the network device 10. The network device 10 may communicate with the user equipment 20 and the user equipment 30.

It should be understood that, in FIG. 1, only two pieces of user equipment within the coverage range of the network device 10 are used as an example. Apparently, there may alternatively be multiple user equipment within the coverage area of the network device 10.

For ease of understanding, in the following embodiments, an example in which the network device is a base station is used for description.

In cellular communication, the base station sends a downlink data packet to user equipment for data transmission. After receiving the data packet sent in a downlink, the user equipment demodulates and decodes the data packet. If the user equipment can correctly receive the data packet, the user equipment feeds back acknowledgment (ACK) information to the base station in an uplink, to indicate that the data is correctly received. If the user equipment cannot correctly receive the data packet, the user equipment feeds back non-acknowledgment (NACK) information to the base station in an uplink, to indicate that the data packet fails to be received. After receiving the NACK information, the base station retransmits the data packet to the user equipment. Such a feedback retransmission mechanism is referred to as a hybrid automatic repeat request (HARQ).

A specific procedure is shown in (a) in FIG. 2. The base station first sends a downlink assignment indicator (DCI, downlink assignment indicator) to target user equipment on a downlink physical control channel (PDCCH, Physical downlink control channel). The DCI is a piece of control signaling, and indicates related information of a scheduled data packet, for example, a size of the data packet, a location of a scheduled time-frequency resource, and a used modulation and coding scheme. The DCI does not include data information. An actual data packet is sent on a physical downlink data channel (PDSCH, Physical downlink shared channel), and after successfully receiving the DCI, the target UE obtains related information of the scheduled PDSCH. After the UE receives, demodulates, and decodes a received signal based on control information obtained in the DCI, the UE may determine, by using a parity bit, whether the data packet is correctly received. If the data packet is correctly received, the UE feeds back ACK information on an uplink control channel. After obtaining the acknowledgment, the base station clears a local buffer and starts to transmit other data packets.

Radio data is transmitted randomly, and some data packets cannot be correctly received by the UE due to various objective conditions (for example, channel interference caused by human). As shown in (b) in FIG. 2, if the UE does not correctly receive the data packet, the UE feeds back the NACK information on an uplink control channel, and after receiving the NACK information, the base station retransmits the current data packet until the UE correctly receives the data packet, or a quantity of times that the base station transmits the current data packet reaches a maximum quantity of retransmission times. If the UE still fails to correctly receive the data packet after the maximum quantity of retransmission times is reached, the current data packet fails to be transmitted.

DCI missed detection is an exception, but still occurs with a specific probability. As shown in (c) in FIG. 2, if DCI on a UE side fails to be received, that is, DCI missed detection occurs. After DCI missed detection occurs, the UE does not know that there is data to be sent to the UE. As a result, the UE does not receive the data packet on the PDSCH, or the UE does not feed back ACK/NACK. In this case, the base station receives no ACK or NACK. When the base station receives no ACK or NACK, the base station still retransmits data until the base station receives an ACK feedback from the UE, or the base station reaches a maximum quantity of retransmission times. Therefore, even if DCI missed detection occurs, a data packet is not directly lost.

In some communication systems, a base station transmits a plurality of downlink transmission packets, and UE feeds back the downlink transmission packets by using same uplink control signaling (UCI, uplink control information).

For example, in a time division duplexing (TDD) standard of a communication system, downlink transmission and uplink transmission between a base station and UE are performed in different slots (timeslots), and a quantity of downlink slots is greater than that of uplink slots. This is because in a wireless network, users usually download more data than they upload. In the TDD communication system, there are usually more downlink slots and fewer uplink slots. In this case, the UE has fewer opportunities to perform an uplink feedback, and usually needs to perform, in one uplink transmission slot, an aggregated ACK feedback about a plurality of downlink data packets transmitted by the base station.

For example, as shown in FIG. 3, there are five slots between a base station and UE, and there are four downlink (Downlink) slots in total marked with "D". U indicates an uplink (Uplink) slot. There is only one uplink (Uplink) slot. All downlink data packets sent in the four downlink slots need to be performed an ACK feedback in the uplink slot by using uplink control information (UCI, uplink control information). Actually, the base station sends three downlink data packets (and corresponding DCI) in the four downlink slots, and a second downlink data packet fails to be received (in FIG. 3, a dashed-line block indicates that the UE fails to receive the downlink data packet, and solid-line blocks indicate that the UE successfully receives the downlink data packet). In this case, in the uplink slot, the UE needs to feed back 3-bit information in the UCI, corresponding to the three previously received downlink data packets. The 3-bit information is "A/N/A", where "A" indicates ACK, and "N" indicates NACK. In this way, the UE feeds back, by using one piece of UCI fed back in the uplink, ACK information about the plurality of downlink data packets transmitted by the base station.

For the aggregated ACK feedback, DCI missed detection causes some problems. Details are shown in FIG. 4a. In this embodiment, UE fails to receive DCI about a first downlink data packet. In this case, the UE cannot realize that there is a downlink data packet for the UE, and therefore does not demodulate a corresponding PDSCH. The UE correctly receives second and third data packets. In this way, when an aggregated feedback is performed in an uplink slot, the UE determines that the base station sends only two data packets to the UE, performs feedback ("A|A") about the two data packets, and performs coding and modulation on the UCI based on 2-bit information. The problem is that the base station considers that the base station sends three data packets, and also considers that the UE feeds back 3-bit ACK information. In this way, when demodulating the feedback information, the base station demodulates the UCI based on that the transmitted information is 3 bits. As a result, the UCI fails to be received, and all feedback information included in the UCI cannot be correctly received.

To resolve this problem, a 2-bit field is added to the DCI, and is referred to as (DAI, Downlink assignment indicator).

The DAI may be understood as a counter. In a plurality of downlink data packets corresponding to one PUCCH, the DAI count in the DCI corresponding to the data packets increases continuously. In this way, even if DCI missed detection occurs, the UE may determine, based on whether a DAI count sequence in the received DCI is continuous, whether DCI missed detection occurs. For example, as shown in FIG. 4b, for a last uplink slot, there are three downlink data packets, and DAI count sequences in DCI corresponding to the three downlink data packets are separately "00", "01", and "10". A first DCI is missed detecting. UE receives only last two pieces of DCI, and the UE determines, based on DAIS "01" and "10" in the two pieces of DCI, that one piece of DCI whose DAI is "00" is missed detecting. In this way, even if DCI missed detection occurs, the UE can also determine that when performing an ACK feedback, the UE feeds back three bits "NINA", to avoid inconsistent understanding of a quantity of feedback bits between the base station and the UE.

Generally, a downlink data packet in a wireless communication system has a high probability of being correctly received. A probability of correctly receiving DCI is about 99%, and the probability of correctly receiving the downlink data packet (PDSCH) is about 90%. A probability that the UE feeds back ACK is greater than a probability that the UE feeds back NACK.

In an embodiment, the UE feeds back NACK only for a downlink data packet that is incorrectly received, and does not perform feedback on a data packet that is correctly received. In this way, after sending the downlink data packet, if the base station does not receive the ACK feedback sent by the UE, it is considered that the downlink data packet is successfully sent. Therefore, only the data packet that is incorrectly received is fed back, so that most feedback overheads can be saved. This reduces power consumption of the UE. The feedback mechanism is a NACK-only mechanism.

As shown in (a) and (b) in FIG. 5, after correctly receiving a downlink data packet, UE does not perform an ACK feedback. The UE performs a NACK feedback only when the downlink data packet is not correctly received. The base station determines, based on the NACK feedback, that the downlink data packet fails to be received, and retransmits the downlink data packet.

A disadvantage of the NACK-only mechanism is that if DCI missed detection occurs, the base station considers that the UE has correctly received the DCI, and does not perform retransmission. (c) in FIG. 2 is compared with (c) in FIG. 5, similarly, when the UE receives the DCI, DCI is missed detecting, and the UE is not aware that the downlink data packet is sent to the UE, and therefore the UE does not receive the data packet or perform the NACK feedback. A difference lies in that in (c) in FIG. 2, according to a normal feedback mechanism, the base station does not receive the ACK feedback, and considers that the UE does not correctly receive the data, and retransmits the data packet, so that the UE can receive the data packet through retransmission. However, in a scenario in (c) in FIG. 5, if the base station does not receive the ACK feedback, according to the NACK-only mechanism, the base station determines that the UE has correctly received the data packet, and therefore does not perform retransmission. As a result, the UE cannot subsequently receive the data packet.

In an embodiment, UE and a base station use both the NACK-only feedback mechanism and the aggregated HARQ feedback mentioned in the foregoing embodiment. In this case, the UE needs to perform, on a same PUCCH, HARQ-ACK feedback on a plurality of PDSCHs sent by the base station. If the feedback information is all ACK, the UE does not perform feedback, or if at least one PDSCH is not successfully received, the UE feeds back HARQ-ACK information.

FIG. 6 is a schematic diagram of applying an aggregated HARQ feedback to a NACK-only mechanism. In each slot, a smaller square indicates DCI, a larger square indicates a PDSCH, a solid line indicates correct reception, and a dashed line indicates fail reception. As shown in FIG. 6, if all PDSCHs corresponding to a first uplink slot are correctly received, the UE does not need to perform an ACK feedback. However, in three PDSCHs corresponding to a second uplink slot, a first PDSCH is not correctly received, and the UE needs to perform feedback in the second uplink slot. Herein, 3-bit information "NINA" needs to be fed back, and indicates that the first data packet fails to be received, and second and third data packets are successfully received.

The NACK-only mechanism applied to the aggregated HARQ feedback has the following disadvantages: In the aggregated HARQ feedback mechanism, because DCI has a DAI (Downlink assignment indicator) field, if a part of DCI corresponding to a plurality of PDSCHs that need to be fed back by using a same PUCCH is missed detecting, the missed detection may be found through continuity of a DAI count, but if all DCI corresponding to the plurality of PDSCHs that need to be fed back by using a same PUCCH is missed detecting, the DCI missed detection cannot be found by using the DAI, and the UE does not send HARQ-ACK information on the PUCCH. If the NACK-only mechanism is used, the base station determines that data is correctly received and the base station does not retransmit the data. In this case, the UE may loss a data packet.

FIG. 7 is a schematic diagram of applying an aggregated HARQ feedback to a NACK-only mechanism. It is assumed that there are four uplink slots. The four uplink slots respectively marked as U1, U2, U3, and U4. The first uplink slot U1 corresponds to two downlink data packets, DAI counts in DCI corresponding to the downlink data packets are "00" and "01", and both the two data packets are correctly received, and the UE does not need to perform feedback about the two data packets.

The fourth uplink slot U4 corresponds to three downlink data packets, and DAI counts in DCI corresponding to the downlink data packets are "00", "01", and "10". DCI corresponding to a first data packet is missed detecting, and second and third data packets are correctly received. The UE actually receives two pieces of DCI. Through the DAI count, the UE finds that the current count does not start from "00", and can be aware that DCI missed detection occurs. Therefore, the UE feeds back "NINA" in the slot U4. It can be learned from this embodiment that the DAI may help the UE find the DCI that is missed detecting in a plurality of PDSCHs corresponding to one PUCCH.

However, the problem is that, if all DCI corresponding to a plurality of PDSCHs that need to be fed back by using a same PUCCH is missed detecting, DAI cannot help the UE find a missed detection phenomenon. For example, in the uplink slot U3 in FIG. 7, HARQ-ACK information corresponding to two PDSCHs needs to be fed back on a PUCCH in U3. DCI corresponding to the two PDSCHs is missed detecting. In this case, the UE does not send HARQ-ACK information on the PUCCH in U3. Because the NACK only feedback is used, the base station does not detect the feedback, and determines that the UE has correctly received the data, and does not perform retransmission. In this way, the packet is lost on the UE.

That is, a NACK-only aggregated HARQ feedback mechanism is used to reduce power consumption overheads. However, the UE does not send the HARQ-ACK information due to DCI missed detection, and the base station determines that the UE correctly receives the HARQ-ACK information. The base station no longer retransmits the data, causing the packet is lost on the UE. Based on the foregoing problems, this application provides a control information sending method.

FIG. 8 is a flowchart of Embodiment 1 of a control information sending method according to the present invention. This embodiment is executed by a base station. As shown in FIG. 8, the method in this embodiment may include the following steps.

Step 101: Send at least one piece of DCI and a PDSCH corresponding to the at least one piece of DCI to user equipment, where the DCI carries a count sequence number.

The count sequence number indicates an accumulated quantity of UCI, the UCI corresponds to a PDSCH scheduled by using the DCI, and the UCI is used to transmit feedback information. That is, values of count sequence numbers in a plurality of pieces of DCI corresponding to each UCI are the same.

Step 102: Detect the feedback message from the user equipment.

The feedback information includes DCI miss-detection information.

In this embodiment, the base station sends the DCI and the PDSCH corresponding to the DCI to the user equipment, where the DCI carries the count sequence number. The user equipment determines, based on continuity of count sequence numbers of a plurality of pieces of DCI corresponding to a plurality of pieces of UCI, whether all DCI corresponding to the UCI is missed detecting. If the user equipment determines that the DCI is missed detecting, the user equipment generates a corresponding feedback message based on a determination result, and the user equipment sends the feedback message to the base station; or if the user equipment determines that the DCI is not missed detecting, the user generates no corresponding feedback message. In this way, the count sequence number is carried in the DCI, to resolve a problem that the plurality of pieces of DCI corresponding to the UCI is missed detecting.

For example, the base station sends eight pieces of DCI and PDSCHs corresponding to the eight pieces of DCI to the user equipment, and every two pieces of DCI and a PDSCH corresponding to the DCI correspond to one piece of UCI. In this case, a count sequence number in two pieces of DCI corresponding to a first piece of UCI indicates an accumulated quantity of the UCI is 1; a count sequence number in two pieces of DCI corresponding to a second piece of UCI indicates an accumulated quantity of the UCI is 2; a count sequence number in two pieces of DCI corresponding to a third piece of UCI indicates an accumulated quantity of the UCI is 3; and a count sequence number in two pieces of DCI corresponding to a fourth piece of UCI indicates an accumulated quantity of UCI is 4. If DCI corresponding to the second UCI and DCI corresponding to the third UCI are missed detecting, because the count sequence number in the DCI corresponding to the first UCI is 1, and the count sequence number in the DCI corresponding to the fourth UCI is 4, it may be determined, based on discontinuity of the count sequence numbers that are in the DCI corresponding to the first UCI and in the DCI corresponding to the fourth UCI, that DCI missed detection occurs.

FIG. 9 is a schematic diagram of transmission of an aggregated HARQ feedback applied to a NACK-only mechanism in a communication system. A base station sends a first group of downlink data packets, and user equipment does not perform feedback on the correctly received first group of downlink data packets. The user equipment does not correctly receive a second group of downlink data packets sent by the base station. When a plurality of pieces of DCI corresponding to the same UCI are all received incorrectly, that is, the plurality of pieces of DCI corresponding to the same UCI is missed detecting, the user equipment cannot detect the miss-detection information, and therefore the user equipment generates no feedback information. When the base station sends a third group of downlink data packets, the user equipment successfully receives the downlink data packet, and based on discontinuity of a count sequence number in DCI that is successfully received most recently (namely, the first group of downlink data packet) and a sequence number in DCI that is successfully received this time (the third group of downlink data packets), it is determined that DCI missed detection occurs, to confirm that a packet is lost in the user equipment. In addition, the corresponding feedback information is generated based on a result of DCI missed detection, and the feedback information is sent to the base station. In the present invention, the count sequence number is carried in the DCI, where the count sequence number indicates the accumulated quantity of the UCI, and the UCI corresponds to the PDSCH scheduled by using the downlink control information. It is determined whether the count sequence numbers in the plurality of pieces of DCI corresponding to the plurality of pieces of UCI are continuous, to determine that the plurality of pieces of DCI corresponding to the same UCI misses detecting in the data packet transmission process, and generate a feedback message shown in FIG. 3. In this way, the base station can retransmit, based on the feedback message, a data packet that is not correctly received by the user equipment, to avoid a case in which a packet is lost on the plurality of PDSCHs corresponding to the same UCI.

Therefore, in an embodiment of this application, the positioning method further includes:

if the feedback information is not received, determining that all DCI corresponding to the UCI is correctly received; or if the feedback information is received, determining, based on the feedback information, that the DCI corresponding to the UCI is missed detecting.

In an embodiment, the base station sends a downlink data packet to the user equipment, where the downlink data packet includes DCI and a PDSCH corresponding to the DCI. If the user equipment successfully receives the DCI and the PDSCH corresponding to the DCI, the user equipment does not generate feedback information corresponding to the downlink data packet; or if the user equipment fails to receive the DCI and the PDSCH corresponding to the DCI, the user equipment generates feedback information corresponding to the downlink data packet. Then the user equipment determines, based on the DCI received this time (for example, the third group of downlink data packets shown in FIG. 9) and the DCI received most recently (for example, the first group of downlink data packets shown in FIG. 9), whether the count sequence numbers in the two pieces of DCI are continuous. If the count sequence numbers are continuous, the user equipment generates no corresponding feedback information; or if the count sequence numbers are discontinuous, the user equipment generates corresponding feedback information (for example, feedback information corresponding to the second group of downlink data packets shown in FIG. 9). If the base station does not receive the feedback information, it is determined that all DCI corresponding to the UCI is correctly received; or if the base station receives the feedback information, it is determined, based on the feedback information, that the DCI corresponding to the UCI is missed detecting.

In other words, the base station may determine, based on whether the feedback information is received, whether DCI missed detection occurs. A detection process is quick and simple, and is easy to implement. Further, the base station may further determine, based on the feedback information, a quantity of DCI that is missed detecting, to retransmit the miss-detection information.

In an embodiment of this application, the feedback information further includes a hybrid automatic repeat request response message. The hybrid automatic repeat request response message indicates whether the plurality of data packets received this time are correctly received. For example, the base station sends three data packets, where a first data packet and a third data packet are correctly received, and the second piece of DCI is missed detecting. As a result, the second data packet is not correctly received, and the first data packet and the third data packet are correctly received. The user equipment needs to perform feedback on a 3-bit hybrid automatic repeat request response message in the UCI. Corresponding to the three previously received downlink data packets, the 3-bit information is separately "A/N/A", and the user equipment can provide a feedback response on, by using the hybrid automatic repeat request response message, whether a data packet being received is missed detecting.

In an embodiment, the base station sends a downlink data packet to the user equipment, where the downlink data packet includes DCI and a PDSCH corresponding to the DCI. If the user equipment successfully receives the DCI and the PDSCH corresponding to the DCI. If the user equipment does not generate a hybrid automatic repeat request response message corresponding to the downlink data packet; or if the user equipment fails to receive the DCI and the PDSCH corresponding to the DCI, the user equipment generates a hybrid automatic repeat request response message (for example, "A/N/A" information) corresponding to the downlink data packet. Then, the user equipment determines, based on the DCI received this time and the DCI received most recently (for example, the first group of downlink data packets shown in FIG. 9), whether the count sequence numbers in the two pieces of DCI are continuous. If the count sequence numbers are continuous, the user equipment generates no corresponding DCI miss-detection information; or if the count sequence numbers are discontinuous, the user equipment generates corresponding DCI miss-detection information (for example, feedback information corresponding to the second group of downlink data packets shown in FIG. 9). If the base station receives no feedback information, it is determined that all the DCI corresponding to the UCI is correctly received; and if the base station receives the feedback information, the base station determines, based on the hybrid automatic repeat request response message, whether the latest sent downlink data packet is correctly received, and determines, based on the DCI miss-detection information, whether all the DCI corresponding to the UCI is missed detecting.

In another embodiment, the DCI further carries a DAI. The DAI indicates an index of a PDSCH corresponding to the DCI carrying the downlink assignment index, or indicates an index of a physical downlink control channel released by downlink semi-persistent scheduling, or indicates a physical downlink shared channel corresponding to downlink control information carrying the downlink assignment index and an index of a physical downlink control channel released by downlink semi-persistent scheduling.

In an embodiment, the base station sends a downlink data packet to the user equipment, where the downlink data packet includes DCI and a PDSCH corresponding to the DCI. The user equipment first determines, based on continuity of DAI counts in a plurality of pieces of DCI corresponding to the current UCI (for example, the DCI received this time and the DCI received most recently), whether a data packet is lost. If the DAI count is discontinuous, it is determined that not all the DCI corresponding to the current UCI is successfully received, and the user equipment generates a hybrid automatic repeat request response message based on a determination result; or if the DAI count is continuous, it is determined that all DCI corresponding to the current UCI is successfully received, and the user equipment does not generate a hybrid automatic repeat request response message. Then the user equipment determines, based on continuity of count sequence numbers in a plurality of pieces of DCI corresponding to the plurality of pieces of UCI (for example, the DCI corresponding to the current UCI and the DCI corresponding to the UCI received most recently), whether all the DCI corresponding to the UCI is missed detecting. If the count sequence numbers are discontinuous and the DAI count is discontinuous, the user equipment generates corresponding DCI miss-detection information based on a determination result, and sends feedback information including the hybrid automatic repeat request response message and the DCI miss-detection information to the base station. If the count sequence number is discontinuous and the DAI count is continuous, the user equipment generates the corresponding hybrid automatic repeat request response message and the DCI miss-detection information, and sends the feedback information including the hybrid automatic repeat request response message and the DCI miss-detection information to the base station. If the count sequence number is continuous and the DAI count is discontinuous, the user equipment generates the corresponding DCI miss-detection information (for example, there is 0 DCI missed detection), and sends feedback information including the hybrid automatic repeat request response message and the DCI miss-detection information to the base station. The base station performs retransmission processing based on the feedback information, and a data packet loss of the user equipment can be avoided. If the count sequence number is continuous and the DAI count is continuous, the user equipment does not generate the corresponding DCI miss-detection information.

In an embodiment, the base station sends a downlink data packet to the user equipment, where the downlink data packet includes DCI and a PDSCH corresponding to the DCI. The user equipment first determines, based on continuity of DAI counts in a plurality of pieces of DCI (for example, the DCI received this time and the DCI received most recently), whether a data packet is lost; or if the DAI count is discontinuous, it is determined that not all DCI corresponding to the current UCI is successfully received, and the user equipment generates information about missing DCI detection based on a determination result (for example, a quantity of missed detection of DCI corresponds to the DCI received this time is 1). If the DAI count is continuous, it is determined that not all the DCI corresponding to the current UCI is successfully received, and the user equipment does not generate the information about missed detection information of DCI. Then the user equipment determines, based on continuity of count sequence numbers in a plurality of pieces of DCI corresponding to a plurality of pieces of UCI (for example, the DCI corresponding to the UCI received this time and the DCI corresponding to the UCI received most recently), whether all the DCI corresponding to the UCI is missed detecting. If the count sequence numbers are discontinuous and the DAI count is discontinuous, the user equipment generates, based on a determination result, corresponding DCI miss-detection information, and sending feedback information including the DCI miss-detection information to the base station. If the count sequence number is discontinuous and the DAI count is continuous, the user equipment generates corresponding DCI miss-detection information, and sending feedback information including the DCI miss-detection information to the base station. If the count sequence number is continuous and the DAI count is discontinuous, the user equipment generates the corresponding DCI miss-detection information (for example, there is 0 previous DCI missed detection, and 1 DCI missed detection corresponding to the received UCI), and sends feedback information including the information about missed detection of DCI to the base station. The base station performs retransmission processing based on the feedback information, and a data packet loss of the user equipment can be avoided. If the count sequence number is continuous and the DAI count is continuous, the user equipment does not generate the corresponding DCI miss-detection information.

Optionally, the base station sends a downlink data packet to the user equipment, where the downlink data packet includes DCI and a PDSCH corresponding to the DCI, and the downlink data packet includes the DCI and a PDSCH corresponding to the DCI. The user equipment first determines whether a DAI count that is in DCI corresponding to the current UCI and that is received this time is the same as a quantity of DCI received by the user; and if same, it is determined that all the DCI corresponds to the current UCI are correctly received; or if different, it is determined that all the DCI corresponds to the current UCI are correctly received.

FIG. 10 shows a communication system supporting a time division duplex (Time division duplexing, TDD) standard according to the present invention. In the TDD standard, downlink transmission and uplink transmission between a base station and user equipment are performed in different slots (timeslots). The four downlink slots correspond to one uplink slot. The base station sends DCI and a PDSCH corresponding to the DCI to the user equipment in the four downlink slots. The user equipment sends uplink control information (UCI, uplink control information) to perform feedback on the base station. The uplink control information carries a feedback message.

The four uplink slots are a first uplink slot U1, a second uplink slot U2, a third uplink slot U3, and a fourth uplink slot U4. The first uplink slot U1 corresponds to two pieces of DCI and two PDSCHs, DAIs carried in the two pieces of DCI are "00" and "01", and count sequence numbers Seq carried in the two pieces of DCI each are 00. The second uplink slot U2 corresponds to one piece of DCI and one PDSCH, and the user equipment fails to receive the corresponding DCI, and therefore misses detecting DCI. The third uplink slot U3 corresponds to two pieces of DCI and two PDSCHs, and the user equipment fails to receive the corresponding DCI, and therefore misses detecting DCI. The fourth uplink slot U4 corresponds to three pieces of DCI and three PDSCHs, DAIs carried in the three pieces of DCI are "00", "01", and "10", and count sequence numbers Seq carried in the DCI each are 11. The user equipment successfully receives the second DCI and the third DCI, but fails to receive the first DCI.

Specifically, the base station sequentially sends a downlink data packet in a downlink slot corresponding to the first uplink slot, where the downlink data packet includes DCI and a PDSCH corresponding to the DCI. The user equipment determines, based on the DAI and the count sequence number in the received DCI, that the DCI corresponding to the current UCI and the DCI corresponding to the previous UCI is not missed detecting, and the user equipment generates no feedback information. The base station separately sends downlink data packets in downlink slots corresponding to the second uplink slot U2 and the third uplink slot U3. Because the user equipment does not receive the downlink data packets, the user equipment generates no corresponding feedback information. The base station sequentially sends three data packets in a downlink slot corresponding to the fourth uplink slot. The user equipment first determines whether a quantity indicated by a DAI in DCI in a data packet received in a last slot is the same as a quantity of DCI received by the user equipment. The DAI in the DCI received in the last slot is "10", the quantity of DCI is 3, and the user equipment receives only two pieces of DCI. In this case, a corresponding hybrid automatic repeat request acknowledgment message (for example, "N/A/A") can be generated based on the determination result, then the user equipment determines whether a count sequence number in the DCI corresponding to the current UCI is continuous with a count sequence number in DCI corresponding to the latest UCI. Because the count sequence number in the DCI corresponding to the current UCI is "11", the count sequence number in the DCI corresponding to the latest UCI is "00", the count sequence numbers are discontinuous, and missed detection of a plurality of pieces of DCI corresponding to two UCI occurs, DCI miss-detection information (for example, "01" indicates that missed detection of a plurality of pieces of DCI corresponding to two pieces of UCI occurs) is generated based on the quantity of pieces of UCI corresponding to the DCI that is missed detecting, and sending feedback information including the miss-detection information and a hybrid automatic repeat request response message to the base station, so that the base station retransmits the miss-detection information based on the feedback information.

It may be understood that this embodiment is described by using only the TDD standard as an example, and this embodiment does not limit an application scope of the present invention. For example, a used standard, for example, frequency division duplex (Frequency Division Duplexing, FDD), is not limited in this application, and different radio frequencies are used for transmission and reception to perform communication.

It may be understood that, in this embodiment, the DCI carries the DAI, and in another embodiment, the DCI may carry only the count sequence number, but does not carry the DAI. Therefore, each UCI corresponds to one piece of DCI, and whether the DCI corresponding to the current UCI is missed detecting may also be determined based on whether count sequence numbers in DCI corresponding to a plurality of pieces of UCI received by the user equipment are continuous.

In an embodiment of this application, the DCI miss-detection information includes an accumulated quantity of UCI corresponding to the DCI that is missed detecting.

For example, as shown in FIG. 10 again, the base station sends a downlink data packet to the user equipment. When the user equipment receives a data packet whose counting sequence numbers in two pieces of DCI corresponding to the current UCI each are 11, and the count sequence number that is in the DCI corresponding to the latest UCI and that is received by the user equipment is 00, it may be determined, based on discontinuous count sequence numbers in DCI corresponding to two pieces of adjacent DCI, that all DCI corresponding to count sequence numbers 01 and 11 is missed detecting, that is, an accumulated quantity of the UCI corresponding to the DCI that is missed detecting is 2, and the user equipment generates the corresponding DCI miss-detection information based on the determination result. The DCI miss-detection information includes the accumulated number of UCI corresponding to the DCI that is missed detecting being 2. The base station determines, based on the DCI miss-detection information, that missed detection of all DCI corresponding to the two pieces of UCI occurs before the data packets whose count sequence numbers each are 11 in the sent DCI, and retransmits the missed data packet based on the feedback information.

In an embodiment of this application, a communication connection may be established between the user equipment and the base station, for example, in an initial access process or a communication connection establishment process, the user equipment reports capability information of the user equipment. The base station may determine, based on the capability information of the user equipment, whether the user equipment has a capability of supporting the NACK-only mechanism. If the user equipment has the capability, the base station may control, on a network side through configuration signaling, the user equipment to enable the function; or if the user equipment does not have the capability, the base station may control, on the network side through configuration signaling, the user equipment to disable the function, or identify, on the base station side, that the user equipment does not have the capability. Definitely, the base station may further determine, based on other features of the user equipment, whether to enable the function, for example, energy saving and real-time tracking.

In this way, the control information sending method in this embodiment further includes:

configuring an enabling rule based on capability information of the user equipment, so that the user equipment determines, according to the enabling rule, that the count sequence number is available. In an embodiment of this application, the DCI carries an indication for temporarily disabling NACK only, to control the user equipment to temporarily disable a NACK only feedback mechanism. Specifically, the base station sends a downlink data packet to the user equipment, where the downlink data packet includes the DCI and a PDSCH corresponding to the DCI. The user equipment temporarily disables the NACK only feedback mechanism based on the indication for temporarily disabling NACK only in the DCI. After the user equipment disables the feedback mechanism, the user equipment receives the downlink data packet sent by the base station. The user equipment needs to generate feedback information regardless of whether the downlink data packet is correctly received or not, and sends the feedback information to the base station.

For example, the count sequence number has a 2-bit count field, the base station sends three data packets that are a PDSCH 1, a PDSCH 2, and a PDSCH 3, to the UE, and each PDSCH corresponds to a separate UCI. The base station determines that there is no more data packet sent to the UE for a long time after the three data packets. In this case, according to the feedback of the NACK only mechanism, if no HARQ feedback is received after the three data packets are delivered, the base station needs to buffer the three data packets in this period of time, because the base station cannot determine whether the three data packets are correctly received or whether DCI missed detection occurs. If missed detecting, the data needs to be retransmitted. Therefore, the data in the buffer cannot be cleared.

In an embodiment of this application, the count sequence number is an independent field.

Further, it should be noted that a quantity of bits of the count sequence number may be any one of bits 1-6. Preferably, the quantity of bits of the count sequence number is 2.

In an embodiment of this application, the count sequence number is a HARQ process number field in the DCI, namely, a hybrid automatic repeat request process number, and a length of the field is 4 bits.

Specifically, the HARQ process number field in the DCI indicates a HARQ process number used when the PDSCH is transmitted. In the communication system, there are usually a plurality of HARQ processes, and one process is used each time a PDSCH is transmitted. In a same HARQ process, only one data packet can be transmitted at the same time. A next data packet can be transmitted only after transmission of a current data packet is completed.

In this embodiment of the present invention, the base station sequentially uses the HARQ process, so that the HARQ process indicates the accumulated quantity of UCI used by the hybrid automatic repeat request response message corresponding to the PDSCH scheduled by using the DCI.

In this way, the base station sends a downlink data packet to the user equipment, and the user equipment determines, according to whether numerical values of HARQ processes in a plurality of pieces of DCI corresponding to the plurality of pieces of UCI are continuous, that all PDSCHs corresponding to the UCI are correctly received by the user equipment if the numerical values of the HARQ processes are continuous; or determines, according to a difference between the numerical values of the discontinuous HARQ processes, that not all PDSCHs corresponding to the UCI are correctly received by the user equipment, and the user equipment determines an accumulated quantity of UCI corresponding to the missed DCI.

FIG. 11 is a schematic diagram of data packet transmission according to an embodiment of the present invention.

In an embodiment, if none of the HARQ process processes is occupied, continuous HARQ process processes are used to transmit a data packet. As shown in FIG. 11, the base station transmits four data packets to the user equipment: a data packet 0, a data packet 1, a data packet 2, and a data packet 3. Because none of a HARQ process 0 (a process number 0), a HARQ process 1 (a process number 1), a HARQ process 2 (a process number 2), and a HARQ process 3 (a process number 3) is occupied, the four data packets, namely, the data packet 0, the data packet 1, the data packet 2, and the data packet 3, are sequentially transmitted by using the HARQ process 0, the HARQ process 1, the HARQ process 2 and the HARQ process 3. Based on whether the values of HARQ process numbers in the plurality of pieces of DCI corresponding to the plurality of pieces of UCI are continuous, when the user equipment receives the data packet 3, the user equipment determines that the HARQ process process numbers in the DCI in the data packet and the DCI in the last received data packet 2 are continuous, and when the user equipment correctly receives data packet 2, the process numbers are discontinuous and have differences. The user equipment sequentially determines that not all Cs corresponding to the UCI are correctly received by the user equipment, generates corresponding feedback information, and sends the feedback information to the base station, so that the base station retransmits the data packet 2 by using the HARQ process 2.

In this embodiment of this application, one data packet includes a plurality of pieces of downlink control information and a downlink physical shared channel corresponding to the downlink control information. For ease of description, the data packet is used as a whole for description.

In an embodiment, a to-be-used HARQ process process is being occupied. For example, if another data packet that is being transmitted uses the HARQ process process, the current HARQ process is skipped, and a subsequent first unoccupied HARQ process is used.

As shown in FIG. 11, because a data packet 5 is transmitted by using the HARQ process 1, a data packet 6 should use the HARQ process 2 according to a rule, but the HARQ process 2 is still being used by a retransmitted data packet (the retransmitted data packet 2 is occupied), and next feedback information feedback time is TAN After receiving the feedback, processing time of the base station is A. If sending time of DCI corresponding to the data packet 6 is before TAN+Δ, the base station cannot determine whether the HARQ process 2 can be released, and therefore skips the HARQ process 2. The data packet 6 is directly transmitted by using the HARQ process 3. The user equipment receives the data packet, and in a determining process, the user equipment first determines that the HARQ process 2 is still occupied by another data packet. When continuously determining, according to the HARQ process, whether a data packet is lost, the user equipment automatically skips the HARQ process 2.

In an embodiment, sending time at which the base station sends DCI corresponding to the new downlink data packet is after the next HARQ ACK feedback time T_AN. If the user equipment generates feedback information, the base station determines, based on the feedback information, that the downlink data packet transmitted by using the process number fails to be transmitted, and the base station transmits the new downlink data packet, skips the current HARQ process, and uses a subsequent first unoccupied HARQ process. If the user equipment correctly receives the data packet and does not provide feedback, the HARQ process is used to transmit the data packet. The HARQ ACK feedback time is time at which the base station waits, after sending a downlink data packet, for the user equipment to return feedback information corresponding to the downlink data packet.

For example, if the base station transmits the data packet 6 in the figure after TAW, the base station has confirmed whether the HARQ process 2 can be released. Specifically, if the user equipment generates the feedback information, and the base station determines that the user equipment fails to receive the data packet, the HARQ process 2 cannot be released, and the process number needs to be used to continue to retransmit the data packet that fails to be received by the user equipment. Therefore, the network uses a next unoccupied HARQ process (namely, the HARQ process 3) to send the data packet 6. However, if the user equipment does not send the feedback information, in the NACK only feedback mechanism, no feedback information indicates that the data packet is correctly received by the user equipment. In this case, the HARQ process 2 is released, and the base station uses the process 2 to transmit the data packet.

In this way, in the present invention, a counting function of the count sequence number is implemented by using a HARQ process number field, and no additional signaling overhead is added, and the function in the foregoing embodiment can be implemented.

FIG. 12 is a flowchart of Embodiment 1 of a control information receiving method according to the present invention. As shown in FIG. 12, this embodiment is executed by user equipment, and the method in this embodiment may include the following steps.

Step 201: Receive at least one piece of DCI and a PDSCH corresponding to the at least one piece of DCI that are sent by a base station, where the DCI carries a count sequence number.

The count sequence number indicates an accumulated quantity of UCI, and the UCI corresponds to a PDSCH scheduled by using the DCI. That is, values of count sequence numbers in a plurality of pieces of DCI corresponding to each UCI are the same.

Step 202: Generate corresponding feedback information based on the count sequence number, where the feedback information includes DCI miss-detection information.

Step 203: Send the feedback message to the base station.

The base station sends the at least one piece of DCI and the PDSCH corresponding to the at least one piece of DCI to the user equipment, and the user equipment determines, based on continuity of count sequence numbers in a plurality of pieces of DCI corresponding to a plurality of pieces of UCI, whether the DCI corresponding to the UCI is missed detecting. If the DCI corresponding to the UCI is missed detecting, corresponding feedback information is generated based on a missed detection result, and the corresponding feedback information is sent to the base station, so that the base station can retransmit the data based on the feedback information.

In an embodiment of this application, as shown in FIG. 13, step 202 specifically includes the following steps.

Step 2021: Determine a latest count value based on a count sequence number field in DCI.

In an embodiment, the user equipment may obtain the latest count value by using a preset mapping table and the count sequence number.

Table 1 shows a mapping table in an embodiment.

TABLE 1

| Mapping table | |
| --- | --- |
| Count sequence number | Latest count value |
| 00 | 1 |
| 01 | 2 |
| 10 | 3 |
| 11 | 4 |

In this embodiment, a field length of the count sequence number is 2 bits. Table 1 shows a correspondence between a count sequence number and a latest count value. It may be understood that the count sequence number is any one of bits 1-6. Certainly, a corresponding mapping table also needs to be correspondingly adjusted.

In another embodiment, the user equipment directly obtains the latest count value by using the count sequence number. For example, if count sequence numbers may be 01, 10, and 11, it may be determined, based on the values of the count sequence numbers, that the latest count values are 1, 2, and 3.

Step 2022: Obtain a difference between the latest count value and a local count value.

The local count value is a value that is recorded by the user equipment and that corresponds to a last received count sequence number field.

Step 2023: Determine, based on the difference, whether DCI is missed detecting.

Specifically, whether the user equipment misses detecting the DCI and a quantity of DCI, corresponding to the UCI, that is missed detecting are determined based on the difference.

If the DCI is missed detecting, perform step 2024 of generating feedback information.

If DCI is not missed detecting, perform step 2025 of generating no feedback information.

In an embodiment, a base station sends at least one piece of DCI and a PDSCH corresponding to the at least one piece of DCI to user equipment, the user equipment obtains the count sequence number in the DCI, and determines a latest count value based on the count sequence number, and the user equipment determines, based on a difference between the latest count value and a local count value, continuity of a plurality of pieces of DCI corresponding to a plurality of pieces of UCI, and if count sequence numbers in the DCI corresponding to the plurality of pieces of UCI are discontinuous, determines that the DCI is missed detecting, and generates corresponding DCI miss-detection information, sends feedback information including the DCI miss-detection information to the base station, so that the base station retransmits missed detection of the data based on the feedback information; or if count sequence numbers in the DCI corresponding to the plurality of pieces of UCI are continuous, determines that no missed detection of DCI occurs, and the user equipment generates no DCI miss-detection information, and the base station does not receive the feedback information, and determines that the user equipment has correctly received the DCI and the PDSCH corresponding to the DCI.

As shown in FIG. 14, in an embodiment of this application, step 2023 specifically includes the following steps.

Step 2027: Determine whether the latest count value is greater than the local count value.

If yes, perform step 2028 of obtaining the difference according to formula 1.

Formula 1: $DS=S_n-\check{S}$, where $\Delta S$ is the difference, $S_n$ is the latest count value, and $S$ is the local count value; or if no, perform step 2029 of obtaining the difference according to formula 2.

Formula 2: $\Delta S=S_n+N-S$, where $N=2^n$, n is a field length of the count sequence number.

Step 2030: Determine whether the difference is 1.

If yes, perform step 2031 of determining that the user equipment does not miss detecting all DCI corresponding to the UCI.

If no, perform step 2032 of determining that all DCI corresponding to $\Delta S-1$ UCI of the user equipment is missed detecting.

In an embodiment, the base station sends at least one piece of DCI and a PDSCH corresponding to the at least one piece of DCI to user equipment; the user equipment obtains a count sequence number in the DCI, and determines a latest count value based on the count sequence number; the user equipment determines whether the latest count value is greater than a local count value, calculates a difference between the new count value and the local count value based on a determination result, and determines, according to a relationship between the difference and 1, and if the difference is 1, determines that the user equipment does not miss detecting all the DCI corresponding to the UCI; or if the difference is greater than 1, determines that the user equipment misses detecting all the DCI corresponding to the at least one piece of UCI.

As shown in FIG. 10, the base station sends a data packet to the user equipment, and a count sequence number of DCI recently received by the user equipment is 11. based on the count sequence number and a preset mapping relationship, for example, a mapping table shown in Table 1, it is determined that a latest count value $S_n$ is 4. Because the count sequence number in the DCI corresponding to the count sequence number U1 that is last recorded is 00, the value of the local count value S is 1, and the latest count value $S_n$ is greater than the local count value S, and $\Delta S = S_n - S = 3$. Because the values of the count sequence numbers of the two pieces of DCI corresponding to the U1 and the U4 are discontinuous, it may be determined that all DCI corresponding to $N_{miss} = \Delta S - 1 = 2$ pieces of UCI is missed detecting, that is, all DCI corresponding to the U2 and the U3 is missed detecting. The user equipment generates DCI miss-detection information based on the determination result, and sends feedback information including the DCI miss-detection information to the base station.

FIG. 15 shows another communication system supporting a TDD (Time division duplexing) standard according to the present invention. In this embodiment, three uplink slots are provided, and include a first uplink slot U1, a second uplink slot U2, and a third uplink slot U3. The first uplink slot U1 corresponds to two pieces of DCI and two PDSCHs, and count sequence numbers carried in the two pieces of DCI each are 11. The second uplink slot U2 corresponds to one piece of DCI and one PDSCH, and none of the user equipment successfully receives the DCI, and therefore misses detecting DCI. Count sequence numbers carried in the DCI each are 00. The third uplink slot U3 corresponds to two pieces of DCI and two PDSCHs, and count sequence numbers carried in the DCI each are 01.

In an embodiment, the base station sends a data packet in a downlink slot corresponding to the first uplink slot U1, and the user equipment correctly receives the data packet and does not generate feedback information. The base station sends the data packet in a downlink slot corresponding to the second uplink slot U2, and the user equipment does not correctly receive the data packet and does not generate feedback information. The base station sends the data packet in a downlink slot corresponding to the third uplink slot U3. After correctly receiving the data packet, the user determines that a count sequence number of the received DCI is 01, and obtains a latest count value $S_n = 2$ based on a sequence number field in the DCI. Because the count sequence number in the DCI corresponding to the count sequence number U1 that is last recorded is 11, the value of the local count value S is 4.

Because $S_n < S$, the difference $\Delta S$ is calculated as $\Delta S = S_n + N - S$, and in this embodiment, the length of the field of the count sequence number is 2 bits, $N = 2^n = 4$, and $\Delta S = 2$.

Therefore, if the count sequence numbers are discontinuous, the user equipment determines that missed detection of all DCI corresponding to $\Delta S - 1 = 1$ UCI occurs, that is, missed detection of all the DCI corresponding to U2 occurs, generates feedback information based on a determination result, and sends the feedback information to the base station. In an embodiment of this application, after step 2032 and step 2033, the method further includes:

replacing the local count value S with the latest count value $S_n$.

For example, if S is 1, $S_n$ is 4, S is changed to 4, that is, $S = S_n = 4$.

It may be understood that, in another embodiment, the DCI received by the user equipment carries only the count sequence number, but does not carry a DAI, and the user equipment obtains the difference based on the latest count value and the local count value, determines, according to a relationship between the difference and 1, that all DCI corresponding to the UCI is missed detecting, and generates a hybrid automatic repeat request response message based on the received PDSCH and the count sequence number value.

In another embodiment of this application, the DCI further carries a DAI, and the feedback information further includes a hybrid automatic repeat request response message. The DAI indicates an index of a PDSCH corresponding to the DCI carrying the downlink assignment index, or indicates an index of a physical downlink control channel released by downlink semi-persistent scheduling, or indicates a physical downlink shared channel corresponding to downlink control information carrying the downlink assignment index and an index of a physical downlink control channel released by downlink semi-persistent scheduling.

As shown in FIG. 16, in an embodiment of this application, the DCI further carries a DAI, and the feedback information further includes a hybrid automatic repeat request response message. A method for generating the hybrid automatic repeat request response message includes the following steps.

Step 2041: Determine, based on the DAI, whether missed detection of DCI corresponding to one piece of same UCI occurs.

Specifically, the user equipment determines whether a quantity of received DCI is the same as a quantity indicated by the DAI. If the quantity of DCI received by the user is the same as the quantity indicated by the DAI, all the DCI is correctly received by the user equipment. If the quantity of DCI received by the user is different from the quantity indicated by the DAI, at least one piece of DCI is not completely correctly received by the user equipment, and the hybrid automatic repeat request response message is generated based on a determination result.

If yes, perform step 2042 of generating the corresponding hybrid automatic repeat request response message; or if no, perform step 2043 of generating no hybrid automatic repeat request response message.

As shown in FIG. 17, a method for generating DCI miss-detection information is specifically as follows:

Step 2044: Determine, based on a count sequence number, whether all DCI corresponding to the UCI is missed detecting.

If yes, perform step 2045 of generating the DCI miss-detection information; or if no, perform step 2046 of generating no DCI miss-detection information.

Specifically, the user equipment determines, based on whether numerical values of count sequence number fields in a plurality of pieces of received DCI corresponding to a plurality of pieces of UCI are continuous, whether the user equipment misses detecting the plurality of pieces of DCI corresponding to the UCI.

It may be understood that in an actual application, the following scenarios may exist:

Scenario 1: The user equipment determines, based on the DAI, that the DCI corresponding to the current UCI is missed detecting, the user equipment determines, based on the count sequence number, that missed detection of not all the DCI corresponding to the UCI occurs, and the user equipment generates corresponding feedback information, where the feedback information includes DCI miss-detection information and a hybrid automatic repeat request response message.

Scenario 2: The user equipment determines, based on the DAI, that the DCI corresponding to the current UCI is not missed detecting, the user equipment determines, based on the count sequence number, that missed detection of not all the DCI corresponding to the UCI occurs, and the user equipment generates corresponding feedback information, where the feedback information includes a hybrid automatic repeat request response message. Scenario 3: The user equipment determines, based on the DAI, that the DCI corresponding to the current UCI is not missed detecting, the user equipment determines, based on the count sequence number, that all the DCI corresponding to the UCI is missed detecting, and the user equipment generates corresponding feedback information, where the feedback information includes DCI miss-detection information and a hybrid automatic repeat request response message.

Scenario 4: The user equipment determines, based on the DAI, that the DCI corresponding to the current UCI is not missed detecting, the user equipment determines, based on the count sequence number, that all the DCI corresponding to the UCI is missed detecting, and the user equipment generates corresponding feedback information, where the feedback information includes DCI miss-detection information and a hybrid automatic repeat request response message.

Scenario 5: The user equipment determines, based on the DAI, that the DCI corresponding to the current UCI is not missed detecting, the user equipment determines, based on the count sequence number, that all the DCI corresponding to the UCI is missed detecting, and the user equipment generates corresponding feedback information, where the feedback information includes DCI miss-detection information.

Scenario 6: The user equipment determines, based on the DAI, that the DCI corresponding to the current UCI is not missed detecting, the user equipment determines, based on the count sequence number, that missed detection of not all the DCI corresponding to the UCI occurs, and the user equipment does not generate corresponding feedback information.

In an embodiment, the control information receiving method further includes:

determining, based on a DAI, whether the DCI corresponding to one piece of same UCI is missed detecting; and if the DCI corresponding to the same UCI is missed detecting, generating a corresponding hybrid automatic repeat request response message, and generating corresponding DCI miss-detection information based on the count sequence number; or if the DCI corresponding to the same UCI is not missed detecting, determining, based on the count sequence number, whether missed detection of all the downlink control information corresponding to the UCI occurs; or if all the DCI corresponding to the UCI is missed detecting, generating corresponding DCI miss-detection information, and generating a corresponding hybrid automatic repeat request response message based on the DAI.

Specifically, the base station sends a downlink data packet to the user equipment, and the user equipment generates feedback information based on a DAI in DCI in the downlink data packet and the count sequence number. If the DCI corresponding to the current UCI or all the DCI corresponding to the UCI is missed detecting, the user equipment generates corresponding miss-detection information and a hybrid automatic repeat request response message, and sends the feedback message including the miss-detection information and the hybrid automatic repeat request response to the base station.

In another embodiment, the control information receiving method further includes:

determining, based on a DAI, whether the DCI corresponding to current UCI is missed detecting; and if the DCI corresponding to the same UCI is missed detecting, generating a corresponding hybrid automatic repeat request response message; or if the DCI corresponding to the same UCI occurs is not missed detecting, generating no corresponding hybrid automatic repeat request response message; and determining, based on the count sequence number, whether missed detection of all downlink control information corresponding to the UCI occurs; and if all the DCI corresponding to the UCI is missed detecting, generating corresponding DCI miss-detection information; or if missed detection of not all the DCI corresponding to the UCI occurs, generating no corresponding DCI miss-detection information.

Specifically, the base station sends a downlink data packet to the user equipment, and the user equipment generates feedback information based on a DAI in DCI in the downlink data packet and the count sequence number. If the DCI corresponding to the current UCI or all the DCI corresponding to the UCI is missed detecting, the user equipment generates corresponding miss-detection information and a hybrid automatic repeat request response message, and sends the feedback message including the miss-detection information and the hybrid automatic repeat request response to the base station. That is, if the DCI corresponding to the current UCI is not missed detecting, no corresponding automatic repeat request response message is generated; or if not all the DCI corresponding to the UCI is missed detecting, no corresponding DCI miss-detection information is generated.

The user equipment determines, based on the determined count sequence number, whether all the DCI corresponding to the UCI is missed detecting. The foregoing has been described above, and details are not described herein again.

In an embodiment of this application, the user equipment further generates DCI miss-detection information based on a determination result, and the user equipment sends a hybrid automatic repeat request response message and the DCI miss-detection information to the base station, so that the base station retransmits, based on the hybrid automatic repeat request response message and the DCI miss-detection information, the miss-detection information of the user equipment. A data packet loss of the user equipment can be avoided.

In an embodiment of this application, the DCI miss-detection information includes an accumulated quantity of the uplink control information corresponding to downlink control information that is missed detecting.

Table 2 is a missed detection mapping table of the DCI miss-detection information in an embodiment.

TABLE 2

| Missed detection mapping table | |
| --- | --- |
| DCI miss-detection information | Quantity of UCI that is missed detecting before |
| 00 | 0 |
| 01 | 1 |
| 10 | 2 |
| 11 | 3 |

Table 2 shows a relationship between DCI miss-detection information and a quantity of UCI that corresponds to all DCI that is missed detecting. In this embodiment, the DCI miss-detection information is 2 bits.

Certainly, it may be understood that, in another embodiment, the field length of the DCI miss-detection information may be another value, for example, may be any one of bits 1-6.

In an embodiment of this application, the count sequence number is an independent field.

Further, it should be noted that a quantity of bits of the count sequence number may be any one of bits 1-6.

In an embodiment of this application, the count sequence number is a HARQ process number field in the DCI, namely, a hybrid automatic repeat request process number, and a length of the field is 4 bits.

FIG. 18 is a schematic diagram of a structure of an embodiment of a network device according to this application. The network device may be configured to perform the control information sending method in the embodiment corresponding to FIG. 8.

As shown in FIG. 18, the network device may include components such as a processor 121 and a memory 122. These components are connected and perform communication through one or more buses.

The processor 121 is a control center of the network device, connects various parts of an entire base station by using various interfaces and lines, and runs or executes a software program and/or a module stored in the memory 122 and invokes data stored in the memory 122, to perform various functions of the base station and/or process data. The processor 121 may include an integrated circuit (integrated circuit, IC for short), for example, may include a single packaged IC, or may include a plurality of connected packaged ICs having a same function or different functions. For example, the processor 121 may be a communication processor (communication processor, CP for short).

The memory 122 may be configured to store a software program and a module, and the processor 121 executes various functional applications of the network device and implements data processing by running the software program and the module that are stored in the memory 122. In a specific implementation of this application, the memory 122 may include a volatile memory such as a nonvolatile dynamic random access memory (nonvolatile random access memory, NVRAM for short), a phase change random access memory (phase change RAM, PRAM for short), and a magnetoresistive random access memory (magnetoresistive RAM, MRAM for short). The memory 122 may further include a nonvolatile memory such as at least one disk storage device, an electrically erasable programmable read-only memory (Electrically erasable programmable read-only memory, EEPROM for short), and a flash memory such as a NOR flash memory (NOR flash memory) or a NAND flash memory (NAND flash memory).

FIG. 19 is a schematic diagram of a structure of an embodiment of user equipment according to this application. The user equipment may be configured to perform the control information sending method in the embodiment corresponding to FIG. 12.

As shown in FIG. 19, the user equipment may include components such as a processor 131 and a memory 132. In addition, these components are connected and perform communication through one or more buses.

The processor 131 is a control center of the user equipment, connects various parts of the entire user equipment by using various interfaces and lines, and runs or executes a software program and/or a module stored in the memory 132 and invokes data stored in the memory 132, to perform various functions of a terminal and/or process data. The processor 131 may include an integrated circuit (Integrated Circuit, IC for short), for example, may include a single packaged IC, or may include a plurality of connected packaged ICs having a same function or different functions. For example, the processor 131 may be a CP.

In specific implementation, this application further provides a computer storage medium, where the computer storage medium may store a program. When the program is executed, a part or all of the steps of embodiments of the control information transmission method provided in this application may be performed. The storage medium may be a magnetic disk, a compact disc, a read-only memory (read-only memory, ROM), a random access memory (random access memory, RAM), or the like.

It may be understood that the memory in embodiments of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Though examples rather than not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these memories and any memory of another proper type.

In this application, that A corresponds to B may be understood as that A is associated with B, or A is associated with B.

It should be understood that division of manners, cases, types, and embodiments in embodiments of this application are merely for ease of description, but should not constitute a special limitation, and features in various manners, types, cases, and embodiments may be combined when there is no contradiction.

It should be further understood that "first" and "second" in embodiments of this application are only for distinguishing and shall constitute no limitation on this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

It may be understood that various numbers in embodiments of this application are merely used for differentiation for ease of description, and are not used to limit the scope of embodiments of this application.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A control information sending method, comprising:
configuring an enabling rule based on capability information of at least one user equipment, so that the at least one user equipment can determine, according to the enabling rule, that a count sequence number is available sending at least one piece of downlink control information (DCI) and a downlink physical shared channel corresponding to the at least one piece of DCI, wherein the at least one piece of DCI carries the count sequence number; and detecting feedback information from the at least one user equipment, wherein the feedback information comprises DCI miss-detection information, wherein the count sequence number indicates an accumulated quantity of pieces of uplink control information, one piece of uplink control information corresponds to a downlink physical shared channel scheduled by using the at least one piece of DCI, and the uplink control information is used for transmitting the feedback information.

2. The method according to claim 1, wherein the method further comprises:
in response to the detecting the feedback information, determining, based on the feedback information, that the at least one piece of DCI corresponding to the uplink control information is not detected.

3. The method according to claim 1, wherein the DCI miss-detection information comprises an accumulated quantity of pieces of uplink control information corresponding to DCI that is not detected.

4. The method according to claim 1, wherein the at least one piece of DCI further carries an indication for temporarily disabling NACK only, to control the user equipment to temporarily disable a NACK-only feedback mechanism.

5. The method according to claim 1, wherein the feedback information further comprises a hybrid automatic repeat request (HARQ) response message.

6. The method according to claim 1, wherein the count sequence number is an independent field or a HARQ process number field.

7. The method according to claim 1, wherein a quantity of bits occupied by the count sequence number is at least one bit and at most six bits.

8. A control information receiving method, comprising:
receiving from a base station at least one piece of downlink control information (DCI) and a downlink physical shared channel corresponding to the at least one piece of DCI, wherein the at least one piece of DCI carries a count sequence number;

generating corresponding feedback information based on the count sequence number, wherein the feedback information comprises DCI miss-detection information, wherein the generating corresponding feedback information based on the count sequence number specifically comprises:

determining a latest count value based on a count sequence number field in the at least one piece of DCI;

obtaining a difference between the latest count value and a local count value, wherein the local count value is a recorded value that corresponds to a last received count sequence number field;

determining, based on the difference, that the at least one piece of DCI is not detected; and in response to determining that the at least one piece of DCI is not detected, generating the feedback information; and sending the feedback information to the base station, wherein the count sequence number indicates an accumulated quantity of pieces of uplink control information, one piece of the uplink control information corresponds to a downlink physical shared channel scheduled by using the at least one piece of DCI, and the uplink control information is used to transmit the feedback information.

9. The method according to claim 8, wherein the count sequence number is an independent field or a HARQ process number field.

10. The method according to claim 8, wherein the DCI miss-detection information comprises an accumulated quantity of pieces of uplink control information corresponding to DCI that is not detected.

11. The method according to claim 8, wherein the downlink control information further carries an indication for temporarily disabling NACK only, and the method further comprises temporarily disabling a NACK-only feedback mechanism.

12. The method according to claim 8, wherein the obtaining a difference between the latest count value and a local count value, and determining, based on the difference, that the at least one piece of DCI is not detected specifically comprises:

determining whether the latest count value is greater than the local count value;

if the latest count value is greater than the local count value, obtaining the difference according to the following formula:

$\Delta S = S_n - S$, wherein $\Delta S$ is the difference, $S_n$ is the latest count value, and S is the local count value; or if the latest count value is not greater than the local count value, obtaining the difference according to the following formula:

$\Delta S = S_b + N - S$, wherein $N = 2^n$, and n is a field length of the count sequence number; and determining that the difference is not 1; and in response to determining that the difference is not 1, determining that the user equipment did not detect all DCI corresponding to 45-1 pieces of uplink control information.

13. The method according to claim 8, wherein the at least one piece of DCI further carries a downlink assignment index, and the generating corresponding feedback information based on the count sequence number specifically comprises:

determining, based on the downlink assignment index, whether DCI corresponding to the same uplink control information is not detected;

if the at least one piece of DCI corresponding to the same uplink control information is not detected, generating a corresponding hybrid automatic repeat request response message; or if the at least one piece of DCI corresponding to the same uplink control information is detected, determining, based on the count sequence number, whether any other DCI corresponding to the uplink control information is not detected; and if any other DCI corresponding to the uplink control information is not detected, generating corresponding DCI miss-detection information.

14. The method according to claim 13, wherein the determining, based on the downlink assignment index, whether DCI corresponding to the same uplink control information is not detected specifically comprises:

determining a latest count value based on a count sequence number field in the at least one piece of DCI;

obtaining a difference between the latest count value and a local count value, wherein the local count value is a value that is recorded by the user equipment and that corresponds to a last received count sequence number field; and determining, based on the difference, whether all DCI corresponding to the uplink control information is not detected.

15. The method according to claim 14, wherein the determining, based on the difference, whether all DCI corresponding to the uplink control information is not detected specifically comprises:

determining whether the latest count value is greater than the local count value;

if the latest count value is greater than the local count value, obtaining the difference according to the following formula:

$\Delta S = S_n - S$, wherein $\Delta S$ is the difference, $S_n$ is the latest count value, and S is the local count value; or if the latest count value is not greater than the local count value, obtaining the difference according to the following formula:

$\Delta S = S_n + N - S$, wherein $N = 2^n$, and n is a field length of the count sequence number; and determining whether the difference is 1; and if the difference is 1, determining that the user equipment did not detect all DCI corresponding to the uplink control information; or if the difference is not 1, determining that the user equipment did not detect all DCI corresponding to $\Delta S - 1$ pieces of uplink control information.

16. An apparatus, comprising:

a memory, configured to store a computer program; and a processor, configured to execute the computer program stored in the memory, wherein when the computer program is executed, the processor is configured to perform the method according to the following steps:

configuring an enabling rule based on capability information of at least one user equipment, so that the at least one user equipment can determine, according to the enabling rule, that a count sequence number is available sending at least one piece of downlink control information (DCI) and a downlink physical shared channel corresponding to the at least one piece of DCI, wherein the at least one piece of DCI carries the count sequence number; and detecting feedback information from the at least one user equipment, wherein the feedback information comprises DCI miss-detection information, wherein the count sequence number indicates an accumulated quantity of pieces of uplink control information, one piece of uplink control information corresponds to a downlink physical shared channel scheduled by using the at least one piece of DCI, and the uplink control information is used for transmitting the feedback information.

\* \* \* \* \*